(12) United States Patent
Nagami et al.

(10) Patent No.: US 11,442,245 B2
(45) Date of Patent: Sep. 13, 2022

(54) IMAGING LENS AND IMAGING APPARATUS

(71) Applicant: FUJIFILM Corporation, Tokyo (JP)

(72) Inventors: Ryosuke Nagami, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 16/689,275

(22) Filed: Nov. 20, 2019

(65) Prior Publication Data

US 2020/0166730 A1    May 28, 2020

(30) Foreign Application Priority Data

Nov. 27, 2018 (JP) .............................. JP2018-221598

(51) Int. Cl.
*G02B 9/12* (2006.01)
*H04N 5/225* (2006.01)

(52) U.S. Cl.
CPC .............. *G02B 9/12* (2013.01); *H04N 5/2258* (2013.01); *H04N 5/2254* (2013.01)

(58) Field of Classification Search
CPC .......... G02B 9/12; G02B 13/18; G02B 13/00; H04N 5/2258; H04N 5/2254
See application file for complete search history.

(56) References Cited

U.S. PATENT DOCUMENTS

| | | |
|---|---|---|
| 5,572,365 A | 11/1996 | Ito |
| 5,956,185 A | 9/1999 | Kang |
| 2003/0048542 A1 | 3/2003 | Enomoto |
| 2007/0070518 A1 | 3/2007 | Muratani et al. |
| 2012/0069456 A1 | 3/2012 | Suzuki |
| 2013/0141629 A1 | 6/2013 | Yoshinaga et al. |
| 2013/0271851 A1 | 10/2013 | Souma |
| 2018/0052383 A1 | 2/2018 | Miyagishima et al. |

(Continued)

FOREIGN PATENT DOCUMENTS

| | | |
|---|---|---|
| CN | 107765421 A | 3/2018 |
| JP | H07-056086 A | 3/1995 |
| JP | H08-136809 A | 5/1996 |

(Continued)

OTHER PUBLICATIONS

An Office Action; "Notice of Reasons for Refusal," mailed by the Japanese Patent Office dated Dec. 14, 2021, which corresponds to Japanese Patent Application No. 2018-221598 and is related to U.S. Appl. No. 16/689,275 with English language translation.

(Continued)

*Primary Examiner* — James C. Jones
(74) *Attorney, Agent, or Firm* — Studebaker & Brackett PC

(57) ABSTRACT

The imaging lens includes, as lens groups, only a positive first lens group, a positive second lens group, and a negative third lens group in order from the object side. An aperture stop is disposed between a lens surface closest to the image side in the first lens group and a lens surface closest to the object side in the third lens group. During focusing, the first lens group and the third lens group do not move, and the second lens group moves. The first lens group consists of a negative lens and a positive lens in order from the object side. The third lens group has a negative lens and a positive lens in order from the object side.

20 Claims, 12 Drawing Sheets

EXAMPLE 1

(56) References Cited

U.S. PATENT DOCUMENTS

2021/0364768 A1* 11/2021 Nagami ............ G02B 15/1461

FOREIGN PATENT DOCUMENTS

| | | |
|---|---|---|
| JP | 2003-057546 A | 2/2003 |
| JP | 2012063676 A | 3/2012 |
| JP | 2012-181508 A | 9/2012 |
| JP | 2013061570 A | 4/2013 |
| JP | 2013-195587 A | 9/2013 |
| JP | 2013-235239 A | 11/2013 |
| JP | 2015043104 A | 3/2015 |
| JP | 2015-075501 A | 4/2015 |
| WO | 2012/026069 A1 | 3/2012 |

OTHER PUBLICATIONS

An Office Action mailed by China National Intellectual Property Administration dated Mar. 23, 2022, which corresponds to Chinese Patent Application No. 201911163077.X and is related to U.S. Appl. No. 16/689,275 with English language translation.

* cited by examiner

EXAMPLE 1

EXAMPLE 3

EXAMPLE 4

EXAMPLE 5

IMAGING LENS AND IMAGING APPARATUS

CROSS-REFERENCE TO RELATED APPLICATIONS

The present application claims priority under 35 U.S.C. § 119 to Japanese Patent Application No. 2018-221598, filed on Nov. 27, 2018. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, a lens system having a three-group configuration has been proposed as an imaging lens applicable to an imaging apparatus such as a digital camera. For example, JP2012-063676A, JP2015-043104A, and JP2013-061570A each describe a lens system in which a first lens group having a positive refractive power, a stop, a second lens group having a positive refractive power, and a third lens group having a negative refractive power are arranged in order from the object side to the image side.

SUMMARY OF THE INVENTION

The imaging lens used in the imaging apparatus is required to be small in order to ensure favorable portability while being configured to be compatible with a large imaging element. In addition, in order to meet the demand for an increase in speed of autofocus in an imaging apparatus, it is also necessary for the imaging lens to achieve an increase in speed of focusing. Further, it is also necessary for the imaging lens to have high optical performance by achieving small fluctuation in aberrations during focusing and favorable aberration correction.

In order to increase the speed of focusing, it is necessary to reduce the weight of a lens group (hereinafter referred to as a focus group) that moves during focusing. However, since the lens system described in JP2012-063676A employs a front focus type in which a first lens group and a second lens group move during focusing, in a case where the speed of focusing is intended to increase, there is room for improvement in terms of reduction in weight of a focus group.

The lens systems described in JP2015-043104A and JP2013-061570A employs an inner focus type configuration in which the second lens group moves during focusing. However, in the lens system which is described in JP2015-043104A and in which a first lens group is composed of two lenses, a positive lens and a negative lens are arranged in order from a position closest to the object side. For this reason, it cannot be said that the symmetric property of the refractive power of the entire lens system including the third lens group having a negative refractive power is satisfactory. This configuration is disadvantageous for correction of lateral chromatic aberration and the like. The other lens system described in JP2015-043104A is disadvantageous for reduction in size since the number of lenses in the first lens group is three or more.

The lens system described in JP2013-061570A also employs an inner focus type configuration in which the second lens group moves during focusing. However, in the lens system described in JP2013-061570A, the third lens group consists of only a negative lens concave toward the object side. Thus, this configuration is disadvantageous for correction of astigmatism and suppression in incident angle of the principal ray of the off-axis rays incident on the image plane.

The present disclosure has been made in consideration of the above-mentioned situation, and its object is to provide an imaging lens, which has less fluctuation in aberrations during focusing and has high optical performance by achieving reduction in size and an increase in speed of focusing, and an imaging apparatus comprising the imaging lens.

According to a first aspect of the present disclosure, there is provided an imaging lens comprising, as lens groups, only three lens groups that consist of, in order from an object side to an image side, a first lens group having a positive refractive power, a second lens group having a positive refractive power, and a third lens group having a negative refractive power. An aperture stop is disposed between a lens surface closest to the image side in the first lens group and a lens surface closest to the object side in the third lens group. During focusing from an object at infinity to a closest object, the first lens group and the third lens group remain stationary with respect to an image plane, and the second lens group moves along an optical axis. The first lens group consists of a negative lens and a positive lens in order from the object side to the image side. The third lens group includes a negative lens and a positive lens in order from the object side to the image side. Assuming that a focal length of the second lens group is f2, and a focal length of the first lens group is f1, Conditional Expression (1) is satisfied.

$$0.25 < f2/f1 < 1 \qquad (1)$$

According to a second aspect of the present disclosure, there is provided an imaging lens comprising, as lens groups, only three lens groups that consist of, in order from an object side to an image side, a first lens group having a positive refractive power, a second lens group having a positive refractive power, and a third lens group having a negative refractive power. An aperture stop is disposed between a lens surface closest to the image side in the first lens group and a lens surface closest to the object side in the third lens group. During focusing from an object at infinity to a closest object, the first lens group and the third lens group remain stationary with respect to an image plane, and the second lens group moves along an optical axis. The first lens group consists of a negative lens and a positive lens in order from the object side to the image side. The second lens group includes at least two cemented lenses in which at least one positive lens and at least one negative lens are cemented. In addition, the third lens group includes a negative lens and a positive lens in order from the object side to the image side.

Hereinafter, the imaging lenses according to the first and second aspects of the present disclosure will be collectively referred to as the imaging lens according to the aspect of the present disclosure. It is preferable that the imaging lens of the above-mentioned aspects of the present disclosure satisfies at least one of Conditional Expressions (2) to (7), (9), or (1-1) to (5-1).

$$0.25 < f/f1 < 1 \qquad (2)$$

$$0.8 < f/f2 < 1.6 \qquad (3)$$

$$-0.8 < f/f3 < 0 \quad (4)$$

$$1.15 < (1-\beta_2^2) \times \beta_3^2 < 2.5 \quad (5)$$

$$0 < v1p - v1n < 30 \quad (6)$$

$$1.8 < N3p < 2.2 \quad (7)$$

$$20 < v3ave < 30 \quad (9)$$

$$0.25 < f2/f1 < 0.9 \quad (1\text{-}1)$$

$$0.25 < f/f1 < 0.9 \quad (2\text{-}1)$$

$$0.9 < f/f2 < 1.45 \quad (3\text{-}1)$$

$$-0.75 < f/f3 < 0 \quad (4\text{-}1)$$

$$1.25 < (1-\beta_2^2) \times \beta_3^2 < 2.4 \quad (5\text{-}1)$$

Here, f is a focal length of the imaging lens in a state where the object at infinity is in focus, f1 is the focal length of the first lens group, f2 is the focal length of the second lens group, f3 is a focal length of the third lens group, $\beta_2$ is a lateral magnification of the second lens group in a state where the object at infinity is in focus, $\beta_3$ is a lateral magnification of the third lens group in a state where the object at infinity is in focus, v1p is an Abbe number of the positive lens of the first lens group based on the d line, v1n is an Abbe number of the negative lens of the first lens group based on the d line, N3p is that a refractive index of a positive lens closest to the image side in the third lens group at the d line, and v3ave is an average of Abbe numbers of all the lenses included in the third lens group based on the d line.

In the imaging lens according to the aspect of the present disclosure, it is preferable that the negative lens and the positive lens of the first lens group are cemented with each other.

In the imaging lens according to the aspect of the present disclosure, it is preferable that a negative lens closest to the object side in the third lens group is a meniscus lens which is convex toward the image side. In the imaging lens according to the aspect of the present disclosure, it is preferable that an image side surface of a positive lens closest to the image side in the third lens group is a convex surface.

In the imaging lens according to the aspect of the present disclosure, it is preferable that the number of lenses included in the third lens group is two. In the configuration in which the number of lenses included in the third lens group is two, it is preferable to satisfy Conditional Expression (8).

$$-5 < v3p - v3n < 15 \quad (8)$$

Here, v3p is an Abbe number of the positive lens of the third lens group based on the d line, and v3n is an Abbe number of the negative lens of the third lens group based on the d line.

An imaging apparatus according to a third aspect of the present disclosure comprises at least one of the imaging lens according to the first aspect of the present disclosure or the imaging lens according to the second aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~group that has a positive refractive power" in the present specification means that the group has a positive refractive power as a whole. Likewise, the "~group having a negative refractive power" means that the group has a negative refractive power as a whole. The term "a lens having a positive refractive power" and the term "a positive lens" are synonymous. The term "a lens having a negative refractive power" and the term "negative lens" are synonymous.

A compound aspheric lens (a lens which is integrally composed of a spherical lens and a film having an aspheric shape formed on the spherical lens, and functions as one aspheric lens as a whole) is not be considered as a cemented lens, and is treated as a single lens. The sign of the refractive power and the surface shape of the lens surface of a lens including an aspheric surface are considered in terms of the paraxial region unless otherwise noted.

In this specification, the term "focal length" used in Conditional Expression is a paraxial focal length. The values used in Conditional Expressions are values in the case of using the d line as a reference in a state where the object at infinity is in focus. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens, which has less fluctuation in aberrations during focusing and has high optical performance by achieving reduction in size and an increase in speed of focusing, and an imaging apparatus including the imaging lens.

DESCRIPTION OF THE PREFERRED EMBODIMENTS

Figure 1:
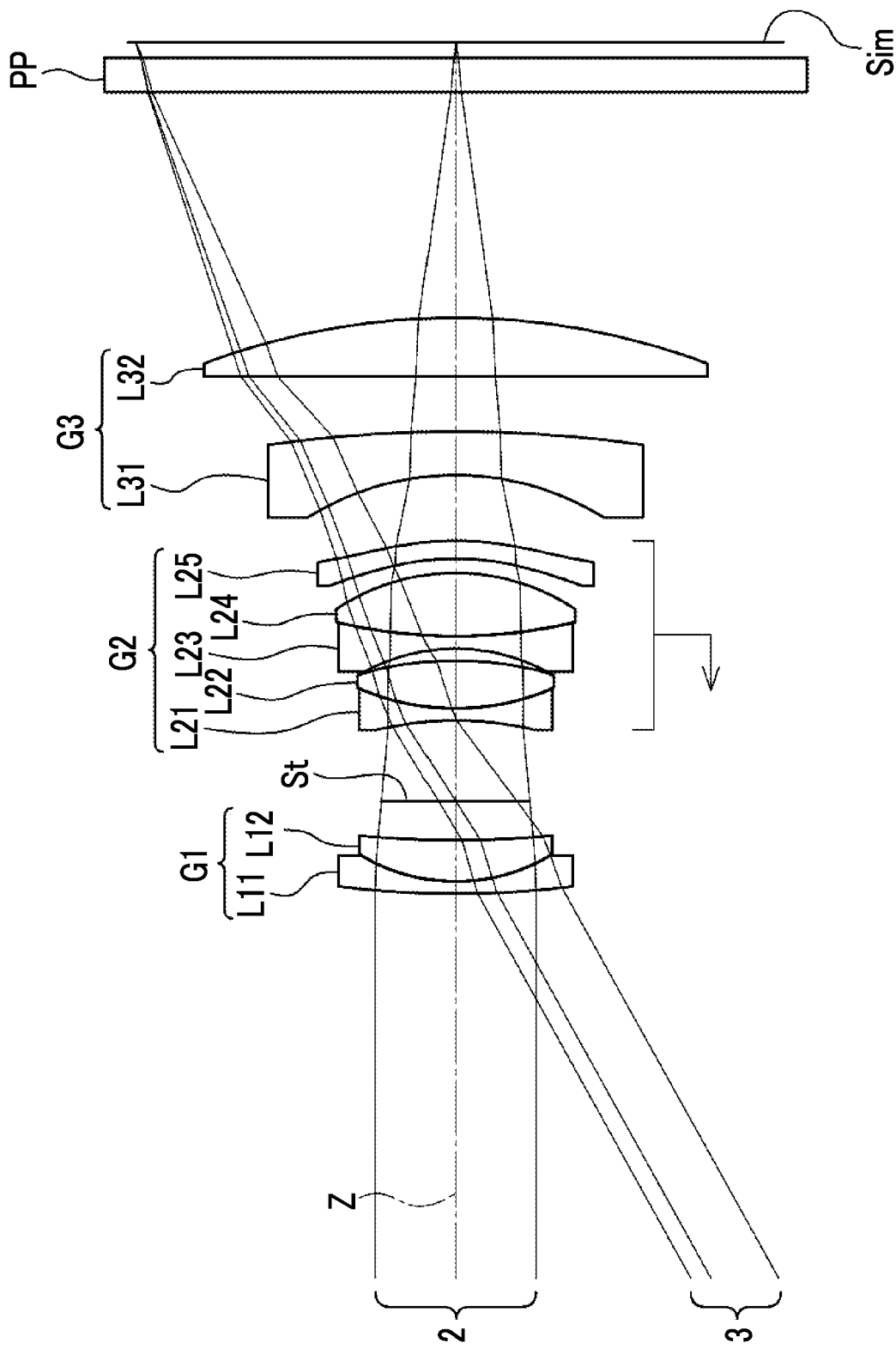
FIG. 1 is a cross-sectional view showing a configuration and rays of an imaging lens according to an embodiment of the present disclosure corresponding to the imaging lens of Example 1 of the present disclosure.

Hereinafter, embodiments of the present disclosure will be described in detail with reference to the accompanying drawings. FIG. 1 is a cross-sectional view showing a configuration of an imaging lens according to an embodiment of the present disclosure. The example shown in FIG. 1 corresponds to the imaging lens of Example 1 to be described later. In FIG. 1, the left side is the object side, the right side is the image side, and a state in which an object at infinity is in focus is shown. FIG. 1 also shows on-axis rays 2 and rays with the maximum angle of view 3 as the rays.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure comprises only three lens group Gs that consist of, in order from the object side to the image side along the optical axis Z, a first lens group G1 having a positive refractive power, a second lens group G2 having a positive refractive power, and a third lens group G3 having a negative refractive power. An aperture stop St is disposed between a lens surface closest to the image side in the first lens group G1 and a lens surface closest to the object side in the third lens group G3. Further, the aperture stop St shown in FIG. 1 does not indicate a shape thereof, but indicates a position thereof on the optical axis.

The imaging lens of the present disclosure is configured such that, during focusing from an object at infinity to a closest object, the first lens group G1 and the third lens group G3 remain stationary with respect to an image plane Sim, and the second lens group G2 moves along an optical axis Z. That is, the imaging lens according to the present disclosure employs an inner focus type in which the second lens group G2 is a focus group. The inner focus type has the advantages that the length of the entire lens system is constant during focusing and that fluctuation in angle of view during focusing is less than that of the front focus type. In the example shown in FIG. 1, the second lens group G2 moves to the object side during focusing from the object at infinity to the closest object. The arrow pointing leftward under the second lens group G2 shown in FIG. 1 means that the second lens group G2 is a focus group that moves to the object side during focusing from the object at infinity to the closest object.

By using only the second lens group as the focus group, it is possible to reduce the weight of the focus group as compared with a lens system in which the focus group consists of a plurality of lens groups. Therefore, it is possible to reduce the size and weight of the focus unit that includes the focus group and the mechanical components provided in the focus group and moves during focusing. As a result, there is an advantage in increasing the speed of focusing.

Since the first lens group G1 has a positive refractive power, the rays emitted from the first lens group G1 are converged and are incident on the second lens group G2. Thus, it is possible to reduce the diameter of the second lens group G2 which is a focus group. Thereby, the focus group can be reduced in size and weight. Therefore, there is an advantage in increasing the speed of focusing.

Since the third lens group G3 has a negative refractive power, the positive refractive power of the second lens group G2 can be increased. Therefore, the amount of movement of the focus group during focusing can be shortened. Thereby, there is an advantage in increasing the speed of focusing and shortening the overall length of the lens system.

For example, in the imaging lens shown in FIG. 1, the first lens group G1 consists of two lenses L11 and L12 in order from the object side to the image side, the second lens group G2 consists of five lenses L21 to L25 in order from the object side to the image side, and the third lens group G3 consists of two lenses L31 and L32 in order from the object side to the image side. However, the number of lenses composing the second lens group G2 and the third lens group G3 may be different from the example shown in FIG. 1.

The first lens group G1 consists of a negative lens and a positive lens in order from the object side to the image side. By making the first lens group G1 have the negative lens and the positive lens, it becomes easy to correct spherical aberration and longitudinal chromatic aberration. In the configuration in which the third lens group G3 has a negative refractive power and the aperture stop St is disposed in the above range, the symmetry property of the refractive power becomes favorable by arranging the lenses of the first lens group G1 in order of a negative lens and a positive lens from the object side. Therefore, there is an advantage in correcting the lateral chromatic aberration. In general, the lateral chromatic aberration tends to increase as the image height increases. Thus, the lens arrangement of the first lens group G1 is advantageous in a case of configuring a lens system compatible with a large imaging element. In addition, the first lens group G1 having two lenses is advantageous for reduction in size.

It is preferable that the negative lens and the positive lens of the first lens group G1 are cemented with each other. In such a case, the lenses can be combined and cemented so as to suppress the deterioration in performance due to the eccentric error of each lens at the time of manufacture. Thus, it is possible to suppress the deterioration in performance due to the manufacturing error. As a result, there is an advantage in ensuring the performance. Further, in a case where the lenses are not cemented, an air gap is generated between the negative lens and the positive lens of the first lens group G1, and the spherical aberration changes due to an error in the air gap. In a case where the lenses are cemented, it is possible to avoid such a problem. Therefore, there is an advantage in ensuring performance.

The negative lens of the first lens group G1 may be a meniscus lens convex toward the object side. The positive lens of the first lens group G1 may be a meniscus lens convex toward the object side. In a case where the negative lens and the positive lens of the first lens group G1 are cemented with each other, in a case where the cemented surface is formed in a shape convex toward the object side, there is an advantage in correcting the lateral chromatic aberration.

It is preferable that the second lens group G2 has at least two cemented lenses in which at least one positive lens and at least one negative lens are cemented. In such a case, the degree of freedom in design increases. There is an advantage in suppressing fluctuation in longitudinal chromatic aberration and fluctuation in lateral chromatic aberration during focusing is performed by changing the imaging distance. This is due to the situations described below. In a case of a so-called overall extension type lens system which is different from the lens system of the present disclosure and in which the entire imaging lens is moved to perform focusing, it is possible to suppress fluctuation in aberrations during focusing by using an optional lens within the whole system. However, since a focus group of the imaging lens according to the present disclosure consists of only the second lens group G2, the number of lenses usable for suppressing fluctuation in aberrations during focusing is limited as compared with the overall extension type lens system. In a case where the second lens group G2 is configured to have two cemented lenses, the heights of the rays that greatly affect the lateral chromatic aberration are different between the two cemented lenses at different positions on the optical axis. Thus, the amounts of change in lateral chromatic aberration with respect to the amounts of change in parameters are also different. Likewise, in the two cemented lenses, the heights of the rays that greatly affect the longitudinal chromatic aberration are different. Thus, the amounts of change in longitudinal chromatic aberration with respect to the amounts of change in design parameters are also different. In such a manner, by using two cemented lenses having different functions and performing optimization while balancing lateral chromatic aberration and longitudinal chromatic aberration, it is possible to appropriately correct chromatic aberration, and thus it is possible to appropriately suppress fluctuation in chromatic aberration during focusing.

In a case where the second lens group G2 has two cemented lenses, for example, the second lens group G2 can be configured to consist of two cemented lenses and five lenses each composed of a negative lens in order from the object side to the image side. Alternatively, in a case where importance is attached to reduction in size, reduction in weight, and an increase in speed of focusing rather than chromatic aberration, the second lens group G2 may be configured to consist of, in order from the object side to the image side, of a positive lens, one cemented lens, and four lenses each composed of a negative lens. In the configuration in which the second lens group G2 consists of four or five lenses, in any of the cemented lenses of the second lens group G2, a negative lens and a positive lens may be cemented in order from the object side. Further, the cemented lens of the second lens group G2 may be configured to consist of a biconcave lens and a biconvex lens. In the configuration in which the second lens group G2 consists of the above four or five lenses, the negative lens closest to the image side in the second lens group G2 may be a meniscus lens convex toward the image side.

The third lens group G3 includes a negative lens and a positive lens in order from the object side to the image side. This configuration is advantageous for correction of field curvature. Further, in the third lens group G3, by arranging the lenses in the order of a negative lens and a positive lens, the exit pupil can be positioned closer to the object side. Therefore, there is an advantage in suppressing the incident angle of the principal ray of the off-axis rays on the image plane Sim. The above configuration of the third lens group G3 is advantageous in a case of configuring a lens system compatible with a large imaging element.

It is preferable that, among the negative lenses included in the third lens group G3, the negative lens closest to the object side is a meniscus lens convex toward the image side. In such a manner, there is an advantage in suppressing astigmatism and distortion.

It is preferable that, among the positive lenses included in the third lens group G3, the image-side surface of the positive lens closest to the image side is a convex surface. In such a case, there is an advantage in suppressing the incident angle of the principal ray of the off-axis rays incident onto the image plane Sim, and there is an advantage in suppressing astigmatism.

It is preferable that the number of lenses included in the third lens group G3 is two. In such a case, there is an advantage in reduction in size.

It is preferable that the aperture stop St remains stationary with respect to the image plane Sim during focusing. In such a case, there is an advantage in reducing the weight of the member that moves during focusing, and there is an advantage in increasing the speed of focusing.

As exemplified in FIG. 1, it is preferable that the aperture stop St is disposed between the first lens group G1 and the second lens group G2. In such a case, a positive refractive power, the aperture stop St, and a positive refractive power are arranged, and it becomes easy to maintain the symmetry property of the refractive powers which are set to be adjacent to the aperture stop St. Thus, there is an advantage in correction of distortion and field curvature. Further, since the aperture stop St is not located in the focus group by disposing the aperture stop St between the first lens group G1 and the second lens group G2, the aperture stop St can be configured to remain stationary with respect to the image plane Sim during focusing. As a result, there is an advantage in increasing the speed of focusing. Furthermore, in the imaging lens of the present disclosure, in a case where the aperture stop St is disposed as described above, as compared with the case where the aperture stop St is disposed between the second lens group G2 and the third lens group G3, there is an advantage in suppressing the incident angle of the principal ray of the off-axis rays incident onto the image plane Sim and ensuring the peripheral light amount.

Next, a configuration relating to Conditional Expressions will be described. Assuming that a focal length of the second lens group G2 is f2 and a focal length of the first lens group G1 is f1, it is preferable to satisfy Conditional Expression (1). By not allowing the result of Conditional Expression (1) to be equal to or less than the lower limit, it becomes easy to suppress fluctuation in aberrations during focusing. In addition, since the refractive power of the first lens group G1 can be ensured, it becomes easy to reduce the diameter of the second lens group G2. Thereby, it becomes easy to reduce the size and the weight of the focus group. Therefore, there is an advantage in increasing the speed of focusing. By not allowing the result of Conditional Expression (1) to be equal to or greater than the upper limit, there is an advantage in shortening the amount of movement of the focus group during focusing. Thus, there is an advantage in speeding up focusing and shortening the overall length of the lens system. By balancing the positive refractive power of the first lens group G1 and the positive refractive power of the second lens group G2 so as to satisfy Conditional Expression (1), it becomes easy to suppress fluctuation in aberrations during focusing and achieve an increase in speed of focusing and reduction in size. In addition, in a case of a configuration in which Conditional Expression (1-1) is satisfied, it is possible to obtain more favorable characteristics.

$$0.25 < f2/f1 < 1 \quad (1)$$

$$0.25 < f2/f1 < 0.9 \quad (1-1)$$

Assuming that a focal length of the imaging lens in a state where the object at infinity is in focus is f, and a focal length of the first lens group G1 is f1, it is preferable to satisfy Conditional Expression (2). By not allowing the result of Conditional Expression (2) to be equal to or less than the lower limit, it is possible to suppress an increase in the diameter of the second lens group G2, and therefore it is possible to suppress an increase in the weight of the focus group. As a result, there is an advantage in increasing the speed of focusing. Further, by distributing the refractive power to the first lens group G1 so as to not allow the result of Conditional Expression (2) to be equal to or less than the lower limit, the refractive power of the second lens group G2 is prevented from becoming excessively strong. As a result, it becomes easy to suppress fluctuation in aberrations during focusing. By distributing the refractive power to the first lens group G1 so as to not allow the result of Conditional Expression (2) to be equal to or greater than the upper limit, the refractive power of the second lens group G2 is prevented from becoming excessively weak. As a result, it is possible to reduce the amount of movement of the focus group during focusing. Thereby, there is an advantage in increasing the speed of focusing and shortening the overall length of the lens system. In addition, in a case of a configuration in which Conditional Expression (2-1) is satisfied, it is possible to obtain more favorable characteristics.

$$0.25 < f/f1 < 1 \quad (2)$$

$$0.25 < f/f1 < 0.9 \quad (2-1)$$

Assuming that a focal length of the imaging lens in a state where the object at infinity is in focus is f, and a focal length of the second lens group G2 is f2, it is preferable to satisfy Conditional Expression (3). By not allowing the result of Conditional Expression (3) to be equal to or less than the lower limit, the refractive power of the second lens group G2 is prevented from becoming excessively weak. As a result, it is possible to reduce the amount of movement of the focus group during focusing. Thereby, there is an advantage in increasing the speed of focusing and shortening the overall length of the lens system. By not allowing the result of Conditional Expression (3) to be equal to or greater than the upper limit, the refractive power of the second lens group G2 is prevented from becoming excessively strong. As a result, it becomes easy to suppress fluctuation in aberrations during focusing. In addition, in a case of a configuration in which Conditional Expression (3-1) is satisfied, it is possible to obtain more favorable characteristics.

$$0.8 < f/f2 < 1.6 \quad (3)$$

$$0.9 < f/f2 < 1.45 \quad (3-1)$$

Assuming that a focal length of the imaging lens in a state where the object at infinity is in focus is f, and a focal length of the third lens group G3 is f3, it is preferable to satisfy Conditional Expression (4). By not allowing the result of Conditional Expression (4) to be equal to or less than the lower limit, the refractive power of the second lens group G2 is prevented from becoming excessively strong. As a result, it becomes easy to suppress fluctuation in aberrations during focusing. By not allowing the result of Conditional Expression (4) to be equal to or greater than the upper limit, it becomes easy to correct field curvature. In addition, in a case of a configuration in which Conditional Expression (4-1) is satisfied, it is possible to obtain more favorable characteristics.

$$-0.8 < f/f3 < 0 \quad (4)$$

$$-0.75 < f/f3 < 0 \quad (4-1)$$

Assuming that a lateral magnification of the second lens group G2 in the state where the object at infinity is in focus is $\beta_2$, and a lateral magnification of the third lens group G3 in a state where the object at infinity is in focus is $\beta_3$, it is preferable to satisfy Conditional Expression (5). By not allowing the result of Conditional Expression (5) to be equal to or less than the lower limit, it is possible to reduce the amount of movement of the focus group during focusing. Thereby, there is an advantage in increasing the speed of focusing and shortening the overall length of the lens system. By not allowing the result of Conditional Expression (5) to be equal to or greater than the upper limit, it becomes easy to suppress fluctuation in aberrations during focusing, in particular, fluctuation in field curvature. By adopting a configuration made such that the lateral magnification of the second lens group G2 and the lateral magnification of the third lens group G3 satisfy Conditional Expression (5), there is an advantage in an increase in speed of focusing, reduction in size, and aberration correction. In addition, in a case of a configuration in which Conditional Expression (5-1) is satisfied, it is possible to obtain more favorable characteristics.

$$1.15 < (1-\beta_2^2) \times \beta_3^2 < 2.5 \quad (5)$$

$$1.25 < (1-\beta_2^2) \times \beta_3^2 < 2.4 \quad (5-1)$$

Assuming that an Abbe number of the positive lens of the first lens group G1 based on the d line is v1p, and an Abbe number of the negative lens of the first lens group G1 based on the d line is v1n, it is preferable to satisfy Conditional Expression (6). By satisfying Conditional Expression (6), longitudinal chromatic aberration and lateral chromatic aberration can be corrected in a balanced manner. In addition, in a case of a configuration in which Conditional Expression (6-1) is satisfied, it is possible to obtain more favorable characteristics.

$$0 < v1p - v1n < 30 \quad (6)$$

$$0 < v1p - v1n < 15 \quad (6-1)$$

Assuming that a refractive index of a positive lens closest to the image side in the third lens group G3 at the d line is N3p, it is preferable to satisfy Conditional Expression (7). By not allowing the result of Conditional Expression (7) to be equal to or less than the lower limit, there is an advantage in suppressing the incident angle of the principal ray of the off-axis rays incident onto the image plane Sim. By not allowing the result of Conditional Expression (7) to be equal to or greater than the upper limit, it becomes easy to correct field curvature. In addition, in a case of a configuration in which Conditional Expression (7-1) is satisfied, it is possible to obtain more favorable characteristics.

$$1.8 < N3p < 2.2 \quad (7)$$

$$1.85 < N3p < 2.1 \quad (7-1)$$

In a configuration in which the third lens group G3 consists of a negative lens and a positive lens in order from the object side to the image side, assuming that an Abbe number of the positive lens of the third lens group G3 based on the d line is ν3p, and an Abbe number of the negative lens of the third lens group G3 based on the d line is ν3n, it is preferable to satisfy Conditional Expression (8). By satisfying Conditional Expression (8), longitudinal chromatic aberration and lateral chromatic aberration can be corrected in a balanced manner. In addition, in a case of a configuration in which Conditional Expression (8-1) is satisfied, it is possible to obtain more favorable characteristics.

$$-5<\nu3p-\nu3n<15 \tag{8}$$

$$-5<\nu3p-\nu3n<10 \tag{8-1}$$

Assuming that an average of Abbe numbers of all the lenses included in the third lens group G3 based on the d line is ν3ave, it is preferable to satisfy Conditional Expression (9). By satisfying Conditional Expression (9), longitudinal chromatic aberration and lateral chromatic aberration can be corrected in a balanced manner. In addition, in a case of a configuration in which Conditional Expression (9-1) is satisfied, it is possible to obtain more favorable characteristics.

$$20<\nu3ave<30 \tag{9}$$

$$23.5<\nu3ave<30 \tag{9-1}$$

Assuming that the lateral magnification of the second lens group G2 in the state where the object at infinity is in focus is $\beta_2$, it is preferable to satisfy Conditional Expression (10). By not allowing the result of Conditional Expression (10) to be equal to or less than the lower limit, it becomes easy to suppress fluctuation in aberrations during focusing. By not allowing the result of Conditional Expression (10) to be equal to or greater than the upper limit, the refractive power of the second lens group G2 is prevented from becoming excessively weak. As a result, it is possible to reduce the amount of movement of the focus group during focusing. Thereby, there is an advantage in increasing the speed of focusing and shortening the overall length of the lens system. In addition, in a case of a configuration in which Conditional Expression (10-1) is satisfied, it is possible to obtain more favorable characteristics.

$$0.1<\beta_2<0.7 \tag{10}$$

$$0.2<\beta_2<0.6 \tag{10-1}$$

Assuming that the lateral magnification of the third lens group G3 in the state where the object at infinity is in focus is $\beta_3$, it is preferable to satisfy Conditional Expression (11). By not allowing the result of Conditional Expression (11) to be equal to or less than the lower limit, it is possible to reduce the amount of movement of the focus group during focusing. Thereby, there is an advantage in increasing the speed of focusing and shortening the overall length of the lens system. By not allowing the result of Conditional Expression (11) to be equal to or greater than the upper limit, it becomes easy to correct field curvature. In addition, in a case of a configuration in which Conditional Expression (11-1) is satisfied, it is possible to obtain more favorable characteristics.

$$1<\beta_3<2.2 \tag{11}$$

$$1.1<f_3<1.6 \tag{11-1}$$

In a case where the lateral magnification of the second lens group G2 and the lateral magnification of the third lens group G3 are set so as to satisfy Conditional Expression (10) and Conditional Expression (11) simultaneously, there is an advantage in an increase in speed of focusing, reduction in size, and favorable aberration correction.

Assuming that a sum of the distance on the optical axis from the lens surface closest to the object side in the first lens group G1 to the lens surface closest to the image side in the third lens group G3 and the air conversion distance on the optical axis from the lens surface closest to the image side in the third lens group G3 to an image side focal position of the imaging lens in a state where the object at infinity is in focus is TL, the focal length of the imaging lens in the state where the object at infinity is in focus is f, and the maximum half angle of view is ω, it is preferable to satisfy Conditional Expression (12). By not allowing the result of Conditional Expression (12) to be equal to or less than the lower limit, it becomes easy to correct field curvature and distortion. By not allowing the result of Conditional Expression (12) to be equal to or greater than the upper limit, there is an advantage in reducing the size and weight of the lens system. By satisfying Conditional Expression (12), it becomes easy to achieve both reduction in size and favorable aberration correction. In addition, in a case of a configuration in which Conditional Expression (12-1) is satisfied, it is possible to obtain more favorable characteristics.

$$2<TL/\{f\times\tan(\omega)\}<2.7 \tag{12}$$

$$2.1<TL/\{f\times\tan(\omega)\}<2.6 \tag{12-1}$$

The above-mentioned preferred configurations and/or available configurations including the configurations relating to Conditional Expressions may be any combination, and it is preferable to selectively adopt the configurations in accordance with required specification. Two preferred embodiments of the imaging lens having the above-mentioned configurations combined will be described below. Both of the imaging lenses of the first and second aspects described below may further have at least one of the above-mentioned preferable configuration and/or possible configuration.

An imaging lens of a first aspect comprises only three lens group Gs that consist of, in order from an object side to an image side, a first lens group G1 having a positive refractive power, a second lens group G2 having a positive refractive power, and a third lens group G3 having a negative refractive power. An aperture stop St is disposed between a lens surface closest to the image side in the first lens group G1 and a lens surface closest to the object side in the third lens group G3. During focusing from an object at infinity to a closest object, the first lens group G1 and the third lens group G3 remain stationary with respect to an image plane Sim, and the second lens group G2 moves along the optical axis Z. The first lens group G1 consists of a negative lens and a positive lens in order from the object side to the image side. The third lens group G3 includes a negative lens and a positive lens in order from the object side to the image side. With such a configuration, Conditional Expression (1) is satisfied. According to the imaging lens of the first aspect, it is possible to reduce the size and increase the speed of focusing, to reduce fluctuation in aberrations during focusing, and to achieve high optical performance.

An imaging lens of a second aspect comprises only three lens group Gs that consist of, in order from an object side to an image side, a first lens group G1 having a positive refractive power, a second lens group G2 having a positive refractive power, and a third lens group G3 having a negative refractive power. An aperture stop St is disposed between a lens surface closest to the image side in the first lens group G1 and a lens surface closest to the object side in the third lens group G3. During focusing from an object at infinity to a closest object, the first lens group G1 and the third lens group G3 remain stationary with respect to an image plane Sim, and the second lens group G2 moves along an optical axis Z. The first lens group G1 consists of a negative lens and a positive lens in order from the object side to the image side. The second lens group G2 includes at least two cemented lenses in which at least one positive lens and at least one negative lens are cemented. In addition, the third lens group G3 includes a negative lens and a positive lens in order from the object side to the image side. According to the imaging lens of the second aspect, it is possible to reduce the size and increase the speed of focusing, to reduce fluctuation in aberrations during focusing, particularly to reduce fluctuation in chromatic aberration, and to achieve high optical performance Next, numerical examples of the imaging lens of the present disclosure will be described.

Example 1

FIG. 1 shows a cross-sectional view showing the configuration of the imaging lens of Example 1, and the illustration method and the configuration thereof are as described above. Therefore, the repeated description is partially omitted here. The imaging lens of Example 1 consists of, in order from the object side to the image side, a first lens group G1 having a positive refractive power, an aperture stop St, a second lens group G2 having a positive refractive power, and a third lens group G3 having a negative refractive power. During focusing from the object at infinity to the closest object, the first lens group G1, the aperture stop St, and the third lens group G3 remain stationary with respect to the image plane Sim, and only the second lens group G2 moves to the object side along the optical axis Z. The first lens group G1 consists of two lenses L11 and L12 in order from the object side to the image side. The second lens group G2 consists of five lenses L21 to L25 in order from the object side to the image side. The third lens group G3 consists of two lenses L31 and L32 in order from the object side to the image side. The outline of the imaging lens of Example 1 has been described above.

Regarding the imaging lens of Example 1, Table 1 shows basic lens data, Table 2 shows a specification, Table 3 shows variable surface distances, and Table 4 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indices of the respective components at the d line, and the column of νd shows Abbe numbers of the respective components based on the d line.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. In Table 1, the variable surface distances, which are distances variable during focusing, are referenced by the reference signs DD[ ], and are written into places of D, where object side surface numbers of distances are noted in [ ].

In Table 2, values of the focal length f of the imaging lens, the back focal length Bf in terms of the air conversion distance, the F number FNo., and the maximum total angle of view 2ω are based on the d line. (°) in the place of 2ω indicates that the unit thereof is a degree. The values shown in Table 2 are values in the case of using the d line as a reference in a state where the object at infinity is in focus.

In Table 3, the columns labeled as "Infinity" and "2000 mm" respectively show a value of the variable surface distance in a state where the object at infinity is in focus and a value of the variable surface distance in a state where the object at the object distance of 2000 mm (millimeters) is in focus. The object distance is a distance on the optical axis from the object to the lens surface closest to the object side.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am (m=3, 4, 5, . . . , 20) shows numerical values of the aspheric surface coefficients for each aspheric surface. The "E±n" (n: an integer) in numerical values of the aspheric surface coefficients of Table 4 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd |
|---|---|---|---|---|
| 1 | 80.042 | 1.03 | 1.64769 | 33.84 |
| 2 | 16.036 | 3.44 | 1.87070 | 40.73 |
| 3 | 90.657 | 3.21 | | |
| 4(St) | ∞ | DD[4] | | |
| 5 | −29.212 | 1.01 | 1.61293 | 37.01 |
| 6 | 21.196 | 3.89 | 1.88300 | 39.22 |
| 7 | −30.375 | 1.00 | | |
| 8 | −16.556 | 1.05 | 1.54814 | 45.83 |
| 9 | 45.149 | 5.26 | 1.65160 | 58.55 |
| 10 | −18.741 | 1.19 | | |
| *11 | −22.131 | 1.50 | 1.77250 | 49.50 |
| *12 | −25.008 | DD[12] | | |
| 13 | −24.341 | 3.63 | 1.84666 | 23.79 |
| 14 | −117.508 | 4.62 | | |
| 15 | ∞ | 4.86 | 2.00100 | 29.13 |
| 16 | −62.542 | 18.83 | | |

TABLE 1-continued

Example 1

| Sn | R | D | Nd | vd |
|---|---|---|---|---|
| 17 | ∞ | 2.85 | 1.51680 | 64.20 |
| 18 | ∞ | | | |

TABLE 2

Example 1

| | |
|---|---|
| f | 48.57 |
| Bf | 22.01 |
| FNo. | 3.56 |
| 2ω(°) | 60.4 |

TABLE 3

Example 1

| | Infinity | 2000 mm |
|---|---|---|
| DD[4] | 6.76 | 6.03 |
| DD[12] | 5.46 | 6.19 |

TABLE 4

Example 1

| Sn | 11 | 12 |
|---|---|---|
| KA | 1.0000000E+00 | 1.0000000E+00 |
| A3 | 0.0000000E+00 | 0.0000000E+00 |
| A4 | 6.9329378E−05 | 9.3215004E−05 |
| A5 | −1.1194555E−05 | −1.5152273E−05 |
| A6 | 1.0209655E−06 | 1.6898484E−06 |
| A7 | 4.7100190E−08 | 1.1019899E−08 |
| A8 | −4.7484147E−09 | −5.9591306E−09 |
| A9 | −3.7046349E−10 | −3.7120650E−10 |
| A10 | −1.6184739E−11 | 8.5503067E−12 |
| A11 | 2.1199506E−12 | 2.0154094E−12 |
| A12 | 1.9561961E−13 | 2.1470193E−13 |
| A13 | 5.5631129E−15 | 5.7714951E−15 |
| A14 | −2.0998957E−16 | −8.4918900E−16 |
| A15 | 1.0517148E−16 | −1.6311106E−16 |
| A16 | −1.6198261E−17 | −5.2589862E−18 |
| A17 | −3.1633953E−18 | −2.6370718E−20 |
| A18 | 3.6331743E−19 | −1.6585141E−20 |
| A19 | −8.3331366E−21 | 2.6087053E−20 |
| A20 | 2.3412194E−23 | −1.4985752E−21 |

Figure 6:
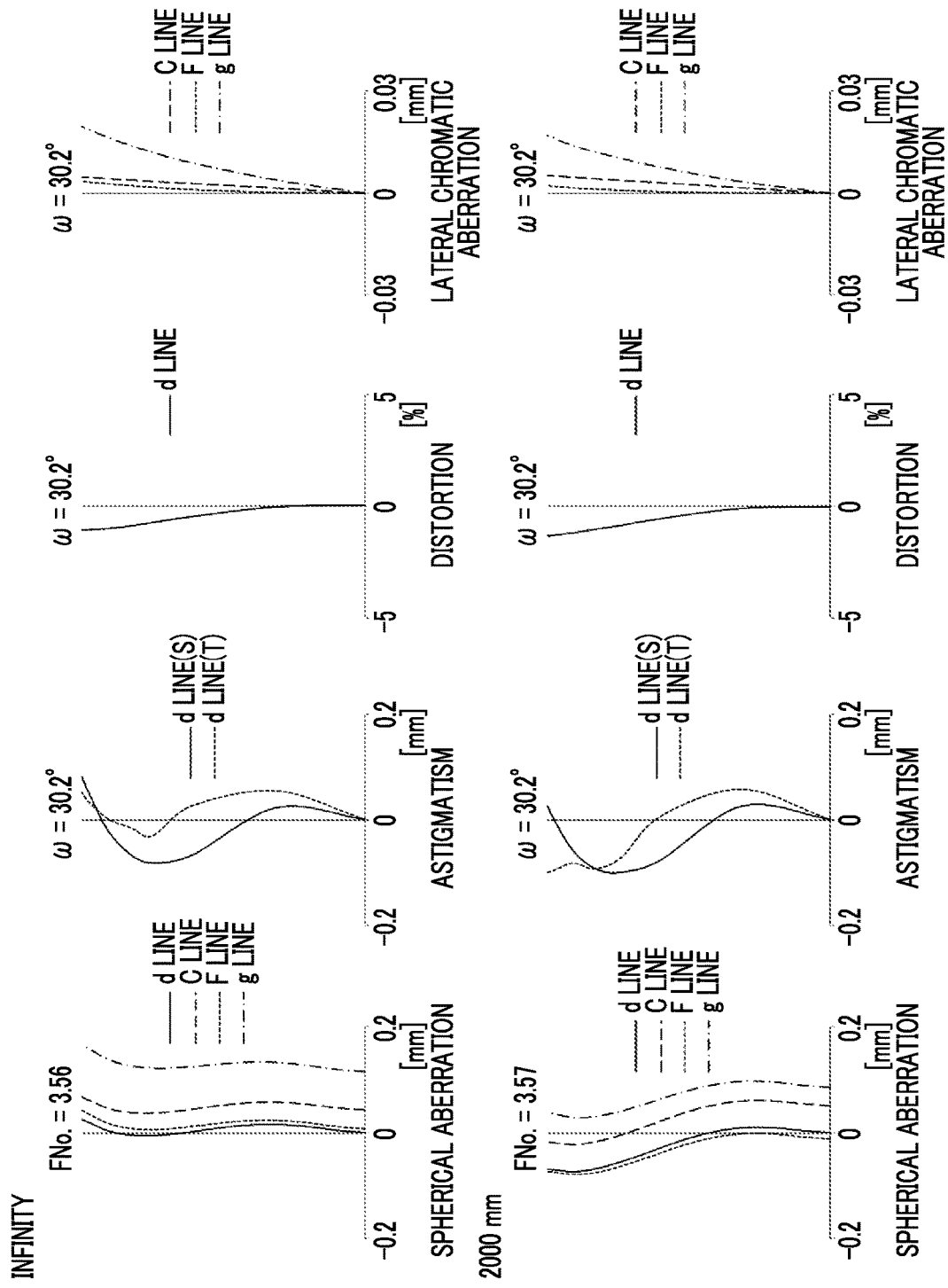
FIG. 6 is a diagram of aberrations of the imaging lens of Example 1 of the present disclosure.

FIG. 6 shows a diagram of aberrations of the imaging lens of Example 1. In FIG. 6, in order from the left side, spherical aberration, astigmatism, distortion, and lateral chromatic aberration are shown. In FIG. 6, the upper part labeled as "infinity" shows aberration diagrams in a state where an object at infinity is in focus, and the lower part labeled as "2000 mm (millimeters)" shows aberration diagrams in a state where an object having an object distance of "2000 mm" is in focus. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line, the F line, and the g line are respectively indicated by the long dashed line, the short dashed line, and the chain line. In the spherical aberration diagram, FNo. indicates an F number. In the other aberration diagrams, ω indicates a maximum half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 2:
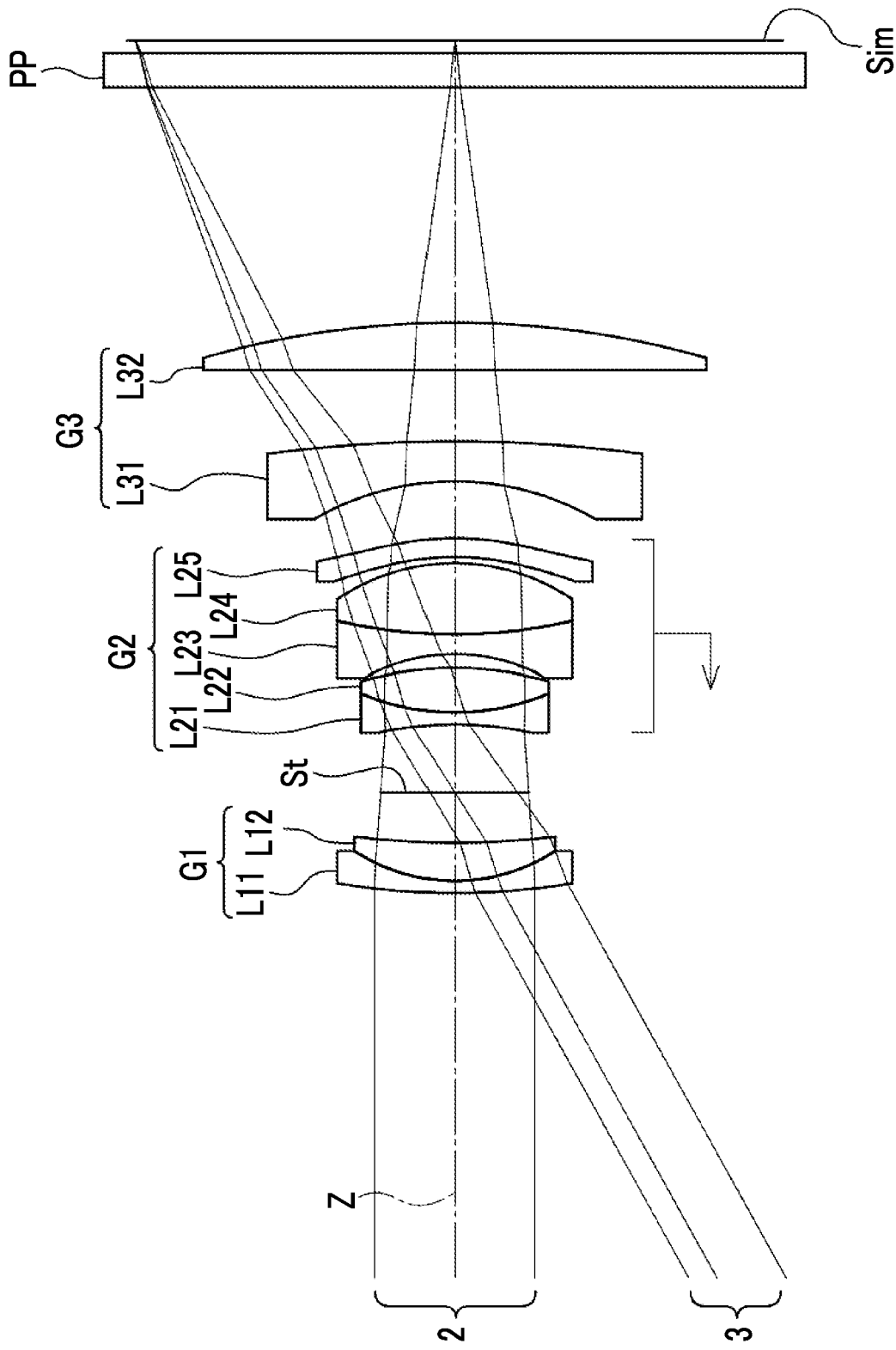
FIG. 2 is a cross-sectional view showing a configuration and rays of the imaging lens according to Example 2 of the present disclosure.
Figure 7:
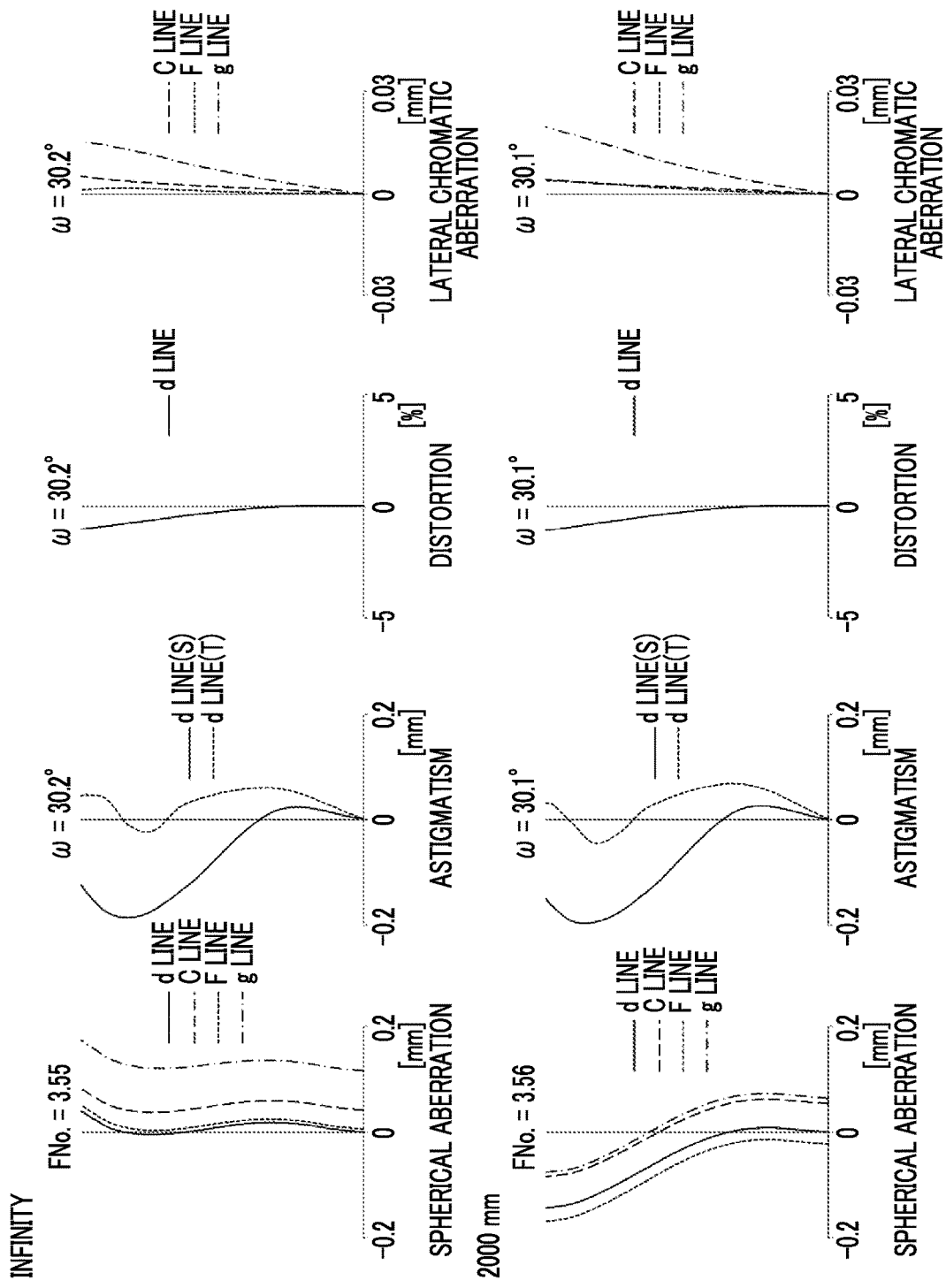
FIG. 7 is a diagram of aberrations of the imaging lens of Example 2 of the present disclosure.

FIG. 2 is a cross-sectional view showing a configuration of the imaging lens of Example 2. The imaging lens of Example 2 has the same configuration as the outline of the imaging lens of Example 1. Regarding the imaging lens of Example 2, Table 5 shows basic lens data, Table 6 shows specification, Table 7 shows variable surface distances, and Table 8 shows aspheric surface coefficients. FIG. 7 shows aberration diagrams. In FIG. 7, the upper part shows aberration diagrams in a state in which the object at infinity is in focus, and the lower part shows aberration diagrams in a state in which the object at the object distance of 2000 mm (millimeters) is in focus.

TABLE 5

Example 2

| Sn | R | D | Nd | vd |
|---|---|---|---|---|
| 1 | 62.547 | 1.01 | 1.67270 | 32.10 |
| 2 | 15.881 | 3.18 | 1.83481 | 42.74 |
| 3 | 73.497 | 4.16 | | |
| 4(St) | ∞ | DD[4] | | |
| 5 | −32.001 | 1.01 | 1.59551 | 39.24 |
| 6 | 21.113 | 3.64 | 1.89190 | 37.13 |
| 7 | −30.540 | 1.15 | | |
| 8 | −16.240 | 1.64 | 1.53172 | 48.84 |
| 9 | 45.122 | 5.94 | 1.65160 | 58.55 |
| 10 | −18.240 | 0.51 | | |
| *11 | −22.499 | 1.57 | 1.80625 | 40.91 |
| *12 | −24.003 | DD[12] | | |
| 13 | −24.421 | 3.34 | 1.85896 | 22.73 |
| 14 | −122.438 | 5.95 | | |
| 15 | ∞ | 3.94 | 1.90366 | 31.31 |
| 16 | −80.306 | 19.63 | | |
| 17 | ∞ | 2.85 | 1.51680 | 64.20 |
| 18 | ∞ | | | |

TABLE 6

Example 2

| | |
|---|---|
| f | 48.54 |
| Bf | 22.57 |
| FNo. | 3.55 |
| 2ω(°) | 60.4 |

TABLE 7

Example 2

| | Infinity | 2000 mm |
|---|---|---|
| DD[4] | 5.69 | 5.17 |
| DD[12] | 4.74 | 5.26 |

TABLE 8

| | Example 2 | |
|---|---|---|
| Sn | 11 | 12 |
| KA | 1.0000000E+00 | 1.0000000E+00 |
| A3 | 0.0000000E+00 | 0.0000000E+00 |
| A4 | 6.7903826E−05 | 9.1740432E−05 |
| A5 | −1.1185017E−05 | −1.4976327E−05 |
| A6 | 1.0368349E−06 | 1.6963876E−06 |
| A7 | 4.8207757E−08 | 1.1403876E−08 |
| A8 | −4.7498433E−09 | −5.9322374E−09 |
| A9 | −3.7734309E−10 | −3.7059522E−10 |
| A10 | −1.7108671E−11 | 8.3667279E−12 |
| A11 | 2.0379508E−12 | 1.9843756E−12 |
| A12 | 1.8912018E−13 | 2.1013188E−13 |
| A13 | 5.3491724E−15 | 5.2973379E−15 |
| A14 | −2.1765961E−16 | −8.8427059E−16 |
| A15 | 1.0947969E−16 | −1.6450576E−16 |
| A16 | −1.5644632E−17 | −5.0478708E−18 |
| A17 | −3.1117477E−18 | 1.1876382E−20 |
| A18 | 3.7210495E−19 | −1.0798695E−20 |
| A19 | −7.2827709E−21 | 2.7227530E−20 |
| A20 | −1.8204800E−22 | −1.6345380E−21 |

Example 3

Figure 3:
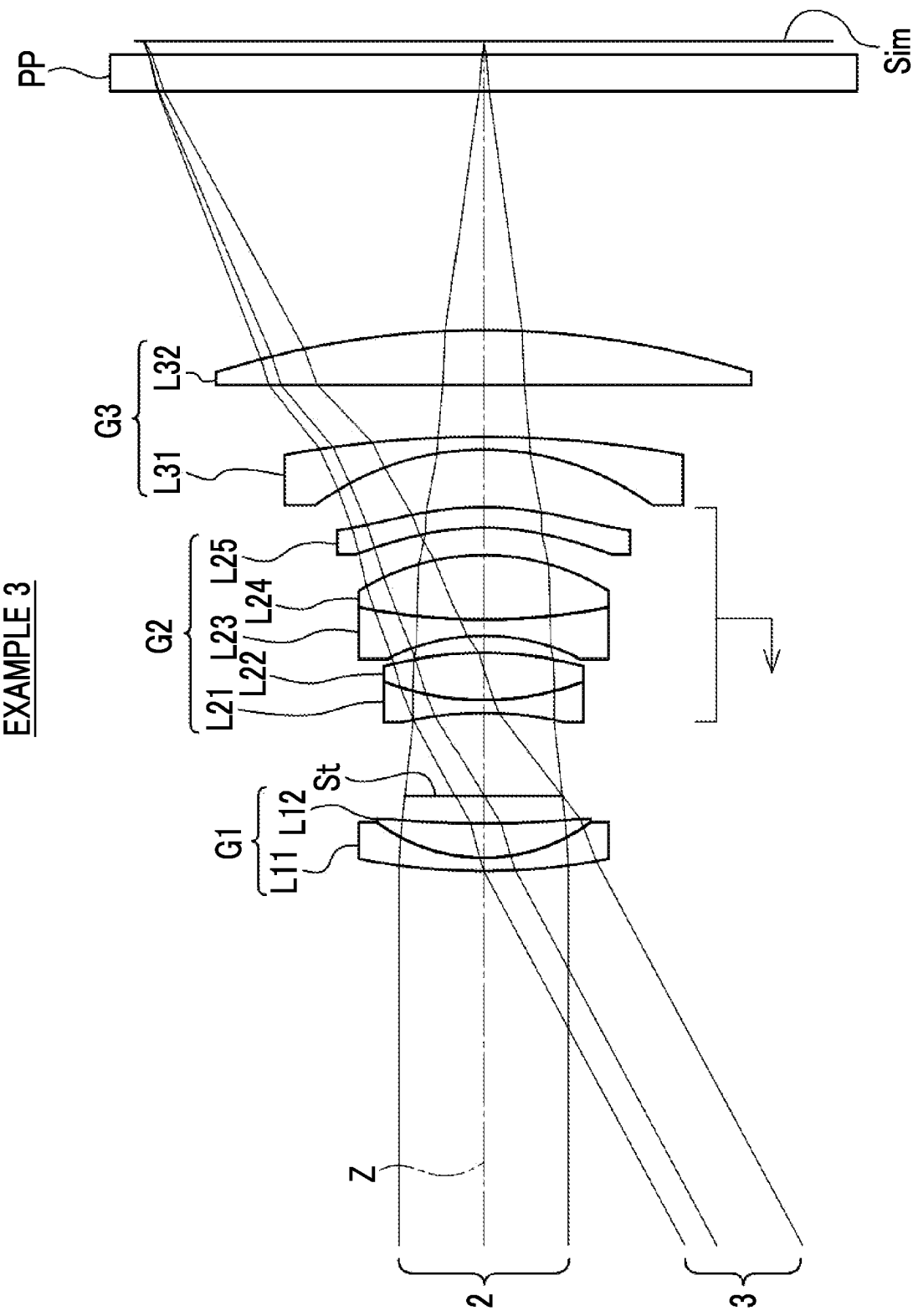
FIG. 3 is a cross-sectional view showing a configuration and rays of the imaging lens according to Example 3 of the present disclosure.
Figure 8:
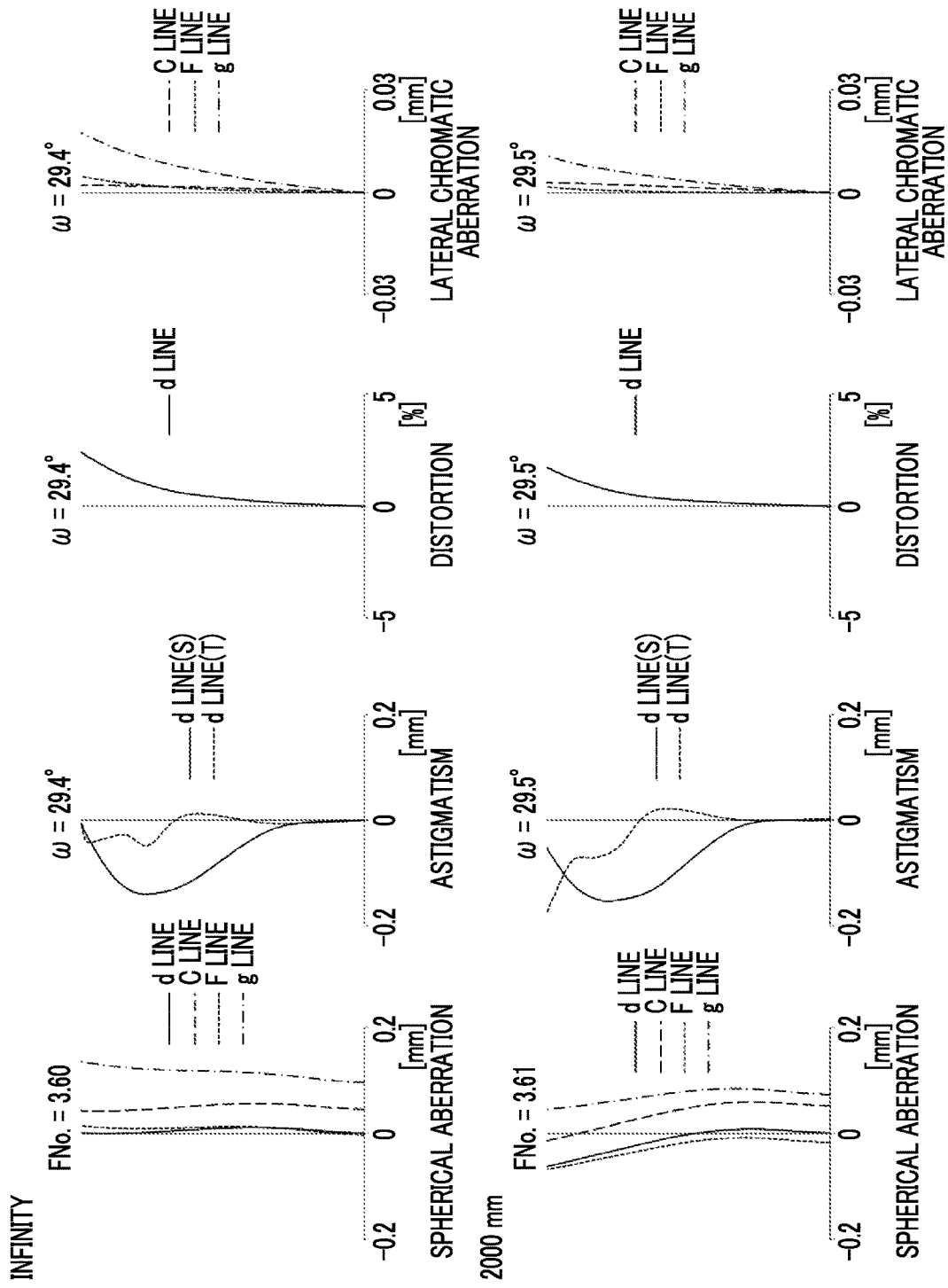
FIG. 8 is a diagram of aberrations of the imaging lens of Example 3 of the present disclosure.

FIG. 3 is a cross-sectional view showing a configuration of the imaging lens of Example 3. The imaging lens of Example 3 has the same configuration as the outline of the imaging lens of Example 1. Regarding the imaging lens of Example 3, Table 9 shows basic lens data, Table 10 shows specification, Table 11 shows variable surface distances, and Table 12 shows aspheric surface coefficients. FIG. 8 shows aberration diagrams. In FIG. 8, the upper part shows aberration diagrams in a state in which the object at infinity is in focus, and the lower part shows aberration diagrams in a state in which the object at the object distance of 2000 mm (millimeters) is in focus.

TABLE 9

| | Example 3 | | | |
|---|---|---|---|---|
| Sn | R | D | Nd | vd |
| 1 | 53.722 | 1.02 | 1.64769 | 33.79 |
| 2 | 14.540 | 2.70 | 1.83481 | 42.74 |
| 3 | 87.028 | 2.16 | | |
| 4(St) | ∞ | DD[4] | | |
| 5 | −29.348 | 1.01 | 1.62588 | 35.70 |
| 6 | 22.628 | 3.64 | 1.88300 | 40.76 |
| 7 | −32.956 | 1.32 | | |
| 8 | −17.604 | 1.28 | 1.51742 | 52.43 |
| 9 | 52.479 | 5.06 | 1.60311 | 60.64 |
| 10 | −19.273 | 2.15 | | |
| *11 | −22.071 | 1.61 | 1.77400 | 49.60 |
| *12 | −24.835 | DD[12] | | |
| 13 | −23.152 | 1.00 | 1.80518 | 25.42 |
| 14 | −90.743 | 4.07 | | |
| 15 | ∞ | 4.29 | 2.05090 | 26.94 |
| 16 | −71.873 | 18.77 | | |
| 17 | ∞ | 2.85 | 1.51680 | 64.20 |
| 18 | ∞ | | | |

TABLE 10

| Example 3 | |
|---|---|
| f | 48.57 |
| Bf | 21.72 |
| FNo. | 3.60 |
| 2ω(°) | 58.8 |

TABLE 11

| | Example 3 | |
|---|---|---|
| | Infinity | 2000 mm |
| DD[4] | 6.50 | 5.59 |
| DD[12] | 4.51 | 5.42 |

TABLE 12

| | Example 3 | |
|---|---|---|
| Sn | 11 | 12 |
| KA | 1.0000000E+00 | 1.0000000E+00 |
| A3 | 0.0000000E+00 | 0.0000000E+00 |
| A4 | 6.4943249E−05 | 8.8316681E−05 |
| A5 | −1.1316437E−05 | −1.4934527E−05 |
| A6 | 1.0562362E−06 | 1.7065143E−06 |
| A7 | 4.8187085E−08 | 1.2186420E−08 |
| A8 | −4.6652975E−09 | −5.9791746E−09 |
| A9 | −3.6812189E−10 | −3.7924329E−10 |
| A10 | −1.6814738E−11 | 8.3620621E−12 |
| A11 | 2.0048613E−12 | 2.0028923E−12 |
| A12 | 1.8249796E−13 | 2.1356201E−13 |
| A13 | 4.4272700E−15 | 5.5988897E−15 |
| A14 | −2.8190079E−16 | −8.7528580E−16 |
| A15 | 1.0453267E−16 | −1.6442870E−16 |
| A16 | −1.6007201E−17 | −5.4791889E−18 |
| A17 | −3.0480296E−18 | −2.7245624E−20 |
| A18 | 3.8315701E−19 | −1.6842696E−20 |
| A19 | −8.8242004E−21 | 2.6378867E−20 |
| A20 | −4.4275403E−23 | −1.4787612E−21 |

Example 4

Figure 4:
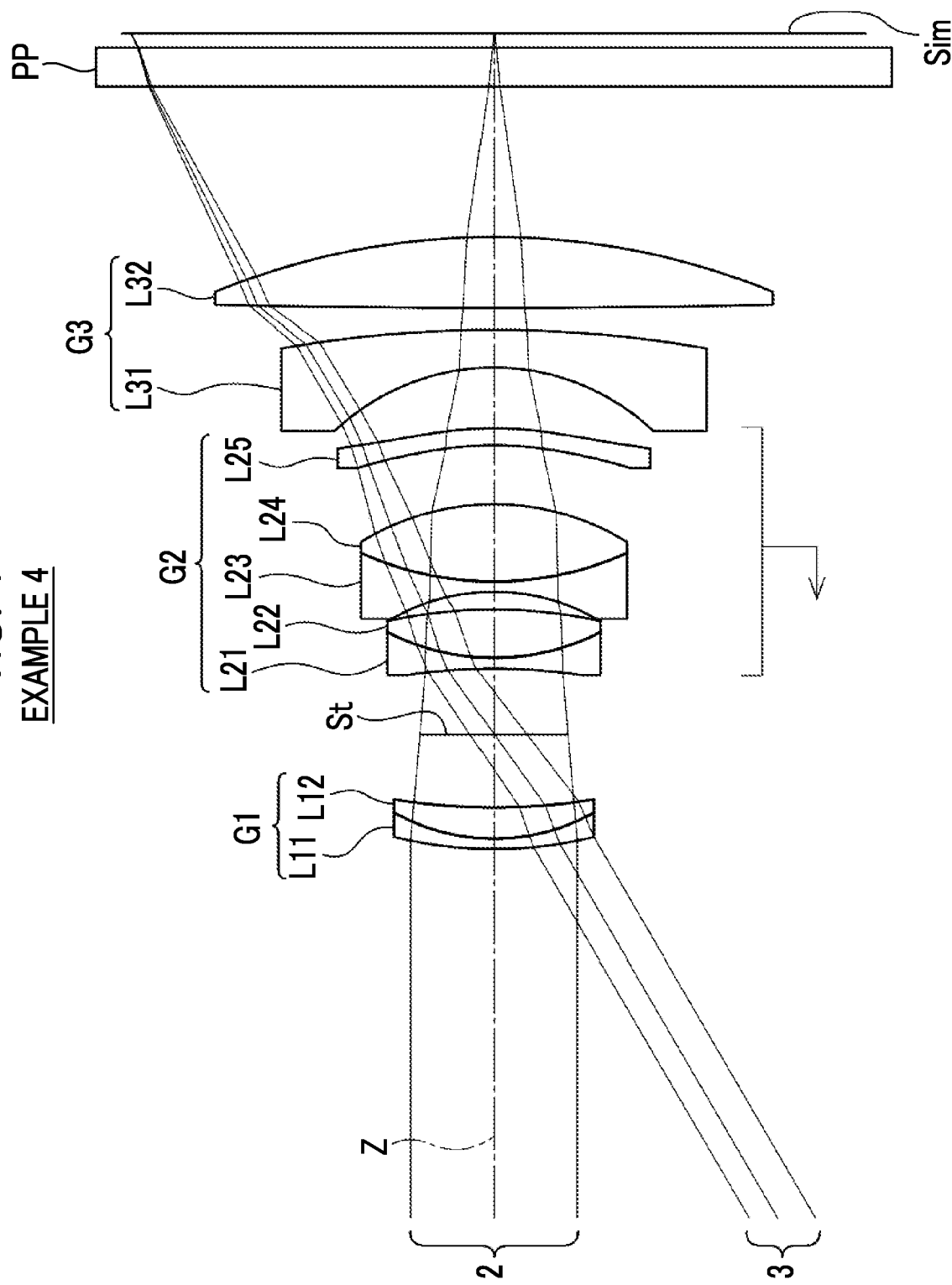
FIG. 4 is a cross-sectional view showing a configuration and rays of the imaging lens according to Example 4 of the present disclosure.
Figure 9:
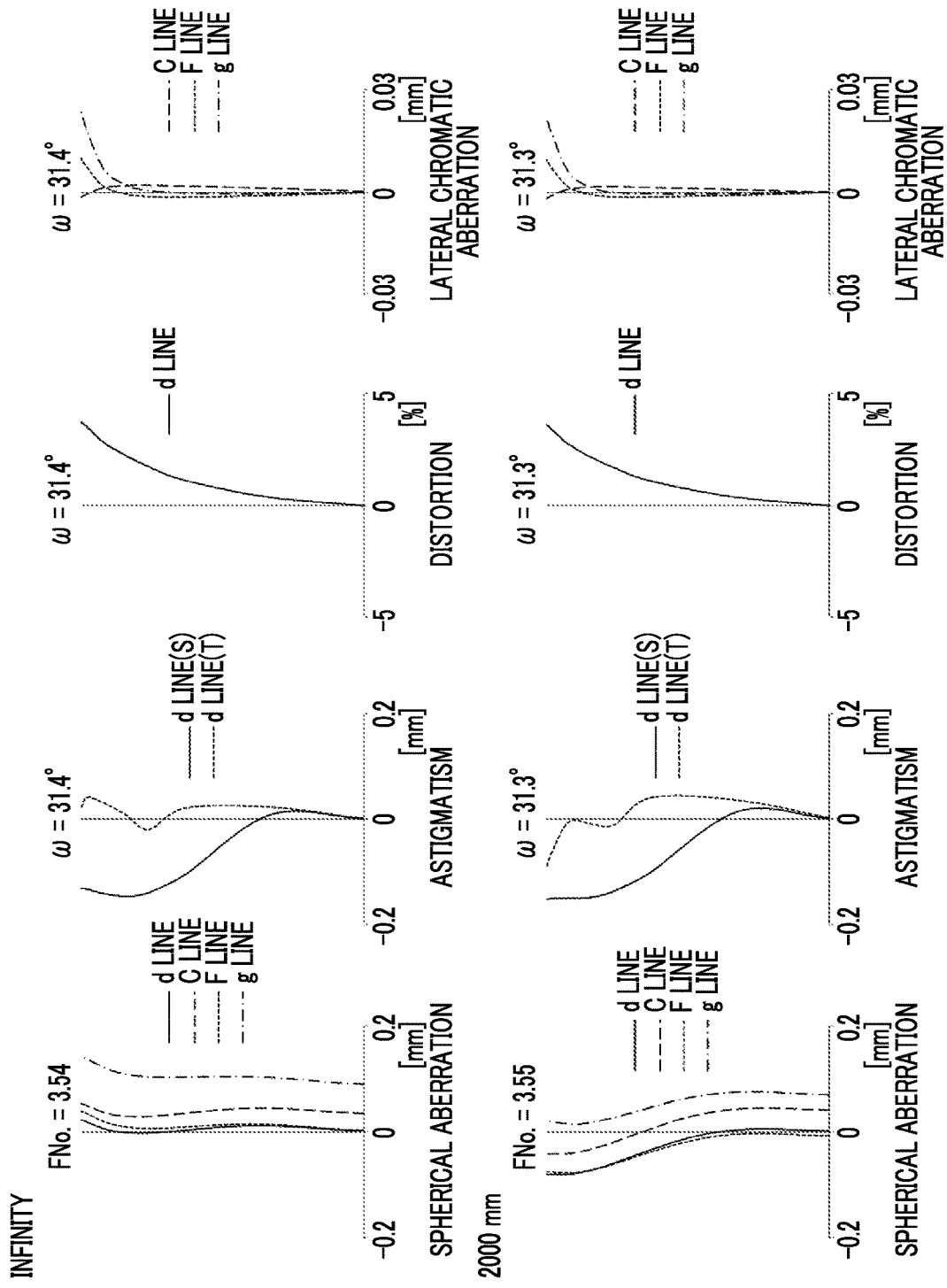
FIG. 9 is a diagram of aberrations of the imaging lens of Example 4 of the present disclosure.

FIG. 4 is a cross-sectional view showing a configuration of the imaging lens of Example 4. The imaging lens of Example 4 has the same configuration as the outline of the imaging lens of Example 1. Regarding the imaging lens of Example 4, Table 13 shows basic lens data, Table 14 shows specification, Table 15 shows variable surface distances, and Table 16 shows aspheric surface coefficients. FIG. 9 shows aberration diagrams. In FIG. 9, the upper part shows aberration diagrams in a state in which the object at infinity is in focus, and the lower part shows aberration diagrams in a state in which the object at the object distance of 2000 mm (millimeters) is in focus.

TABLE 13

| | Example 4 | | | |
|---|---|---|---|---|
| Sn | R | D | Nd | vd |
| 1 | 32.161 | 0.76 | 1.67270 | 32.10 |
| 2 | 15.601 | 2.30 | 1.80400 | 46.58 |
| 3 | 48.720 | 5.37 | | |
| 4(St) | ∞ | DD[4] | | |
| 5 | −46.768 | 0.81 | 1.60342 | 38.03 |
| 6 | 17.896 | 3.55 | 1.85150 | 40.78 |
| 7 | −37.620 | 1.30 | | |
| 8 | −15.846 | 0.76 | 1.54814 | 45.78 |
| 9 | 24.793 | 5.68 | 1.65160 | 58.55 |
| 10 | −19.444 | 4.34 | | |
| *11 | −25.527 | 1.25 | 1.77400 | 49.60 |
| *12 | −26.540 | DD[12] | | |
| 13 | −17.751 | 2.76 | 1.80518 | 25.42 |
| 14 | −95.649 | 1.56 | | |
| 15 | 954.163 | 5.21 | 1.96300 | 24.11 |
| 16 | −56.789 | 11.07 | | |
| 17 | ∞ | 2.85 | 1.51680 | 64.20 |
| 18 | ∞ | | | |

TABLE 14

Example 4

| | |
|---|---|
| f | 44.20 |
| Bf | 14.01 |
| FNo. | 3.54 |
| 2ω(°) | 62.8 |

TABLE 15

Example 4

| | Infinity | 2000 mm |
|---|---|---|
| DD[4] | 4.82 | 4.24 |
| DD[12] | 4.47 | 5.05 |

TABLE 16

Example 4

| Sn | 11 | 12 |
|---|---|---|
| KA | 1.0000000E+00 | 1.0000000E+00 |
| A3 | 0.0000000E+00 | 0.0000000E+00 |
| A4 | 7.1817193E−05 | 1.1128434E−04 |
| A5 | −6.4461023E−06 | −1.5144397E−05 |
| A6 | 7.1033849E−07 | 1.9132423E−06 |
| A7 | 3.1399725E−08 | −3.5732597E−10 |
| A8 | −4.9142794E−09 | −7.5444206E−09 |
| A9 | −3.5189268E−10 | −4.4101884E−10 |
| A10 | −1.3719128E−11 | 9.1082269E−12 |
| A11 | 2.3047110E−12 | 2.3076457E−12 |
| A12 | 1.9463475E−13 | 2.3329482E−13 |
| A13 | 2.3660184E−15 | 6.7500117E−15 |
| A14 | −7.9887108E−16 | −7.9799225E−16 |
| A15 | 6.1511353E−17 | −1.5986170E−16 |
| A16 | −1.5291807E−17 | −5.9709336E−18 |
| A17 | −2.4944063E−18 | −1.4867271E−20 |
| A18 | 4.2520378E−19 | −2.5583406E−20 |
| A19 | −5.6960778E−21 | 2.6038303E−20 |
| A20 | −6.9631398E−22 | −1.4406905E−21 |

Example 5

Figure 5:
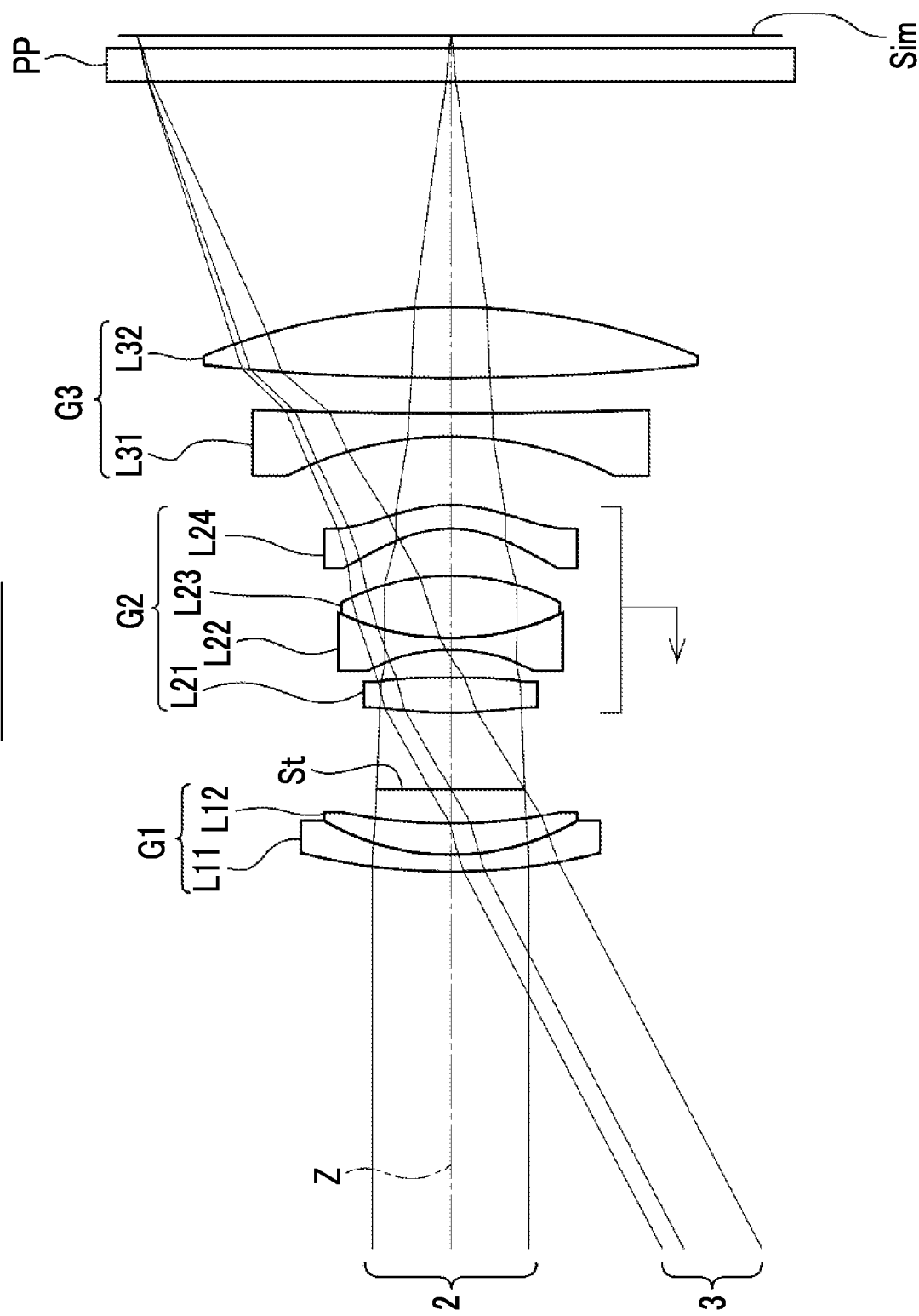
FIG. 5 is a cross-sectional view showing a configuration and rays of the imaging lens according to Example 5 of the present disclosure.
Figure 10:
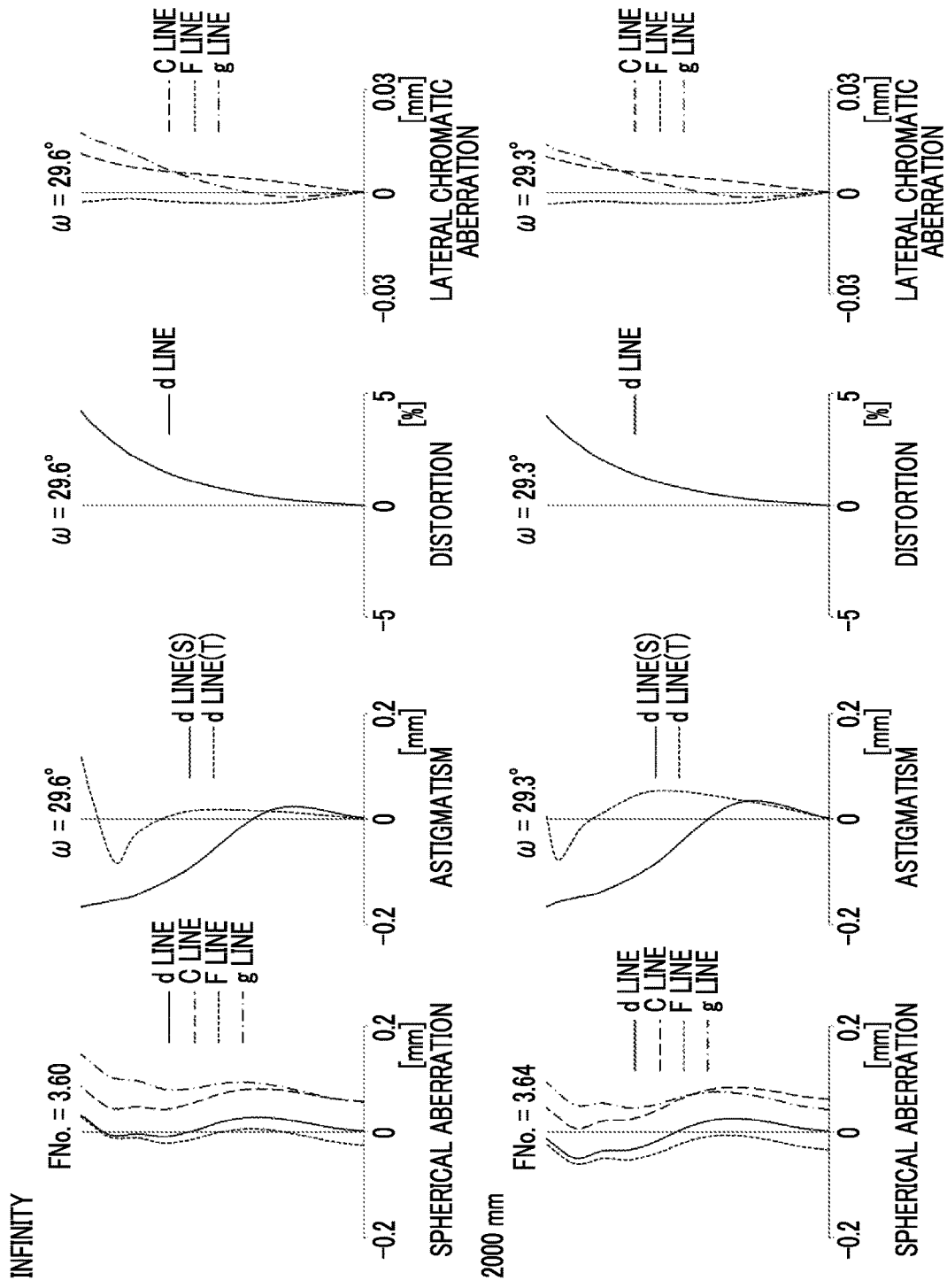
FIG. 10 is a diagram of aberrations of the imaging lens of Example 5 of the present disclosure.

FIG. 5 is a cross-sectional view showing a configuration of the imaging lens of Example 5. The imaging lens of Example 5 has a configuration substantially the same as the imaging lens of Example 1 except that the second lens group G2 consists of four lenses L21 to L24 in order from the object side to the image side. Regarding the imaging lens of Example 5, Table 17 shows basic lens data, Table 18 shows specification, Table 19 shows variable surface distances, and Table 20 shows aspheric surface coefficients. FIG. 10 shows aberration diagrams. In FIG. 10, the upper part shows aberration diagrams in a state in which the object at infinity is in focus, and the lower part shows aberration diagrams in a state in which the object at the object distance of 2000 mm (millimeters) is in focus.

TABLE 17

Example 5

| Sn | R | D | Nd | νd |
|---|---|---|---|---|
| 1 | 54.380 | 1.41 | 1.63980 | 34.47 |
| 2 | 22.209 | 2.70 | 1.88300 | 39.22 |
| 3 | 50.000 | 2.88 | | |
| 4(St) | ∞ | DD[4] | | |
| *5 | 36.947 | 3.00 | 1.69350 | 53.18 |
| *6 | −129.708 | 2.26 | | |
| 7 | −16.214 | 1.01 | 1.67270 | 32.17 |
| 8 | 23.000 | 5.29 | 1.87070 | 40.73 |
| 9 | −21.050 | 4.00 | | |
| *10 | −10.401 | 2.00 | 1.69350 | 53.18 |
| *11 | −13.669 | DD[11] | | |
| 12 | −32.148 | 2.00 | 1.75520 | 27.53 |
| 13 | 553.528 | 3.00 | | |
| 14 | 212.375 | 6.00 | 1.95375 | 32.32 |
| 15 | −57.809 | 19.16 | | |
| 16 | ∞ | 2.85 | 1.51680 | 64.20 |
| 17 | ∞ | | | |

TABLE 18

Example 5

| | |
|---|---|
| f | 48.84 |
| Bf | 22.11 |
| FNo. | 3.60 |
| 2ω(°) | 59.2 |

TABLE 19

Example 5

| | Infinity | 2000 mm |
|---|---|---|
| DD[4] | 6.50 | 5.59 |
| DD[11] | 5.82 | 6.73 |

TABLE 20

Example 5

| Sn | 5 | 6 | 10 | 11 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.3707505E−05 | −9.6105123E−05 | 1.4797454E−04 | 1.6916886E−04 |
| A5 | −4.3306735E−07 | 1.9212569E−06 | 8.8452449E−06 | −7.7675551E−06 |
| A6 | −5.5804768E−07 | −8.5668678E−07 | 4.9701757E−09 | 2.3112837E−06 |
| A7 | −8.0027824E−09 | −1.6013757E−08 | 9.1392512E−08 | −1.6391478E−08 |
| A8 | 3.5902068E−09 | −8.3227814E−10 | 7.0553411E−09 | −8.2732702E−09 |
| A9 | 4.4711695E−10 | 4.7908619E−10 | −1.1594046E−10 | −2.9022246E−10 |
| A10 | −1.7573484E−10 | −3.4660063E−11 | −7.3299775E−11 | 2.5620674E−11 |
| A11 | −2.5563945E−11 | −5.9538971E−12 | −6.8559264E−12 | 3.5394890E−12 |
| A12 | −3.6936627E−12 | −1.1696405E−12 | −2.1649008E−13 | 1.6409340E−13 |

TABLE 20-continued

Example 5

| Sn | 5 | 6 | 10 | 11 |
|---|---|---|---|---|
| A13 | −4.6614703E−14 | −1.0452064E−13 | 3.6418769E−14 | −1.4416768E−14 |
| A14 | 9.0177140E−14 | −1.0211850E−15 | 7.6341071E−15 | −3.2603129E−15 |
| A15 | 1.6499968E−14 | 1.1638832E−15 | 6.9040638E−16 | −2.9423023E−16 |
| A16 | 2.5419290E−16 | 1.5197303E−16 | 2.6917744E−17 | −6.7143418E−18 |
| A17 | 1.7267336E−16 | −3.1712370E−17 | −3.5561484E−18 | 2.1405181E−18 |
| A18 | 2.7825040E−16 | −1.3611014E−19 | −8.5525038E−19 | 4.0751470E−19 |
| A19 | −1.0653375E−16 | 6.4080645E−18 | −5.7118302E−20 | 2.7056396E−20 |
| A20 | 8.2140895E−18 | −7.8166583E−19 | 1.1737306E−20 | −4.3530299E−21 |

Table 21 shows values corresponding to Conditional Expressions (1) to (12) of the imaging lenses of Examples 1 to 5. In Examples 1 to 5, the d line is set as the reference wavelength. Table 21 shows the values based on the d line.

TABLE 21

| Expression number | | Example 1 | Example 2 | Example 3 | Example 4 | Example 5 |
|---|---|---|---|---|---|---|
| (1) | f2/f1 | 0.548 | 0.337 | 0.817 | 0.508 | 0.269 |
| (2) | f/f1 | 0.620 | 0.487 | 0.761 | 0.598 | 0.278 |
| (3) | f/f2 | 1.132 | 1.442 | 0.931 | 1.176 | 1.035 |
| (4) | f/f3 | −0.337 | −0.643 | −0.413 | −0.643 | −0.037 |
| (5) | $(1 - \beta_2^2) \times \beta_3^2$ | 1.610 | 2.270 | 1.280 | 1.670 | 1.310 |
| (6) | ν1p − ν1n | 6.89 | 10.64 | 8.95 | 14.48 | 4.75 |
| (7) | N3p | 2.001 | 1.904 | 2.051 | 1.963 | 1.954 |
| (8) | ν3p − ν3n | 5.34 | 8.58 | 1.52 | −1.31 | 4.79 |
| (9) | ν3ave | 26.46 | 27.02 | 26.18 | 24.77 | 29.92 |
| (10) | $\beta_2$ | 0.44 | 0.31 | 0.56 | 0.42 | 0.24 |
| (11) | $\beta_3$ | 1.41 | 1.58 | 1.36 | 1.42 | 1.18 |
| (12) | TL/{f × tan(ω)} | 2.47 | 3.47 | 4.47 | 5.47 | 6.47 |

As can be seen from the above data, each imaging lens of Examples 1 to 5 has less fluctuation in aberrations during focusing by achieving reduction in size and an increase in speed of focusing and has high optical performance by satisfactorily correcting various aberrations.

Figure 11:
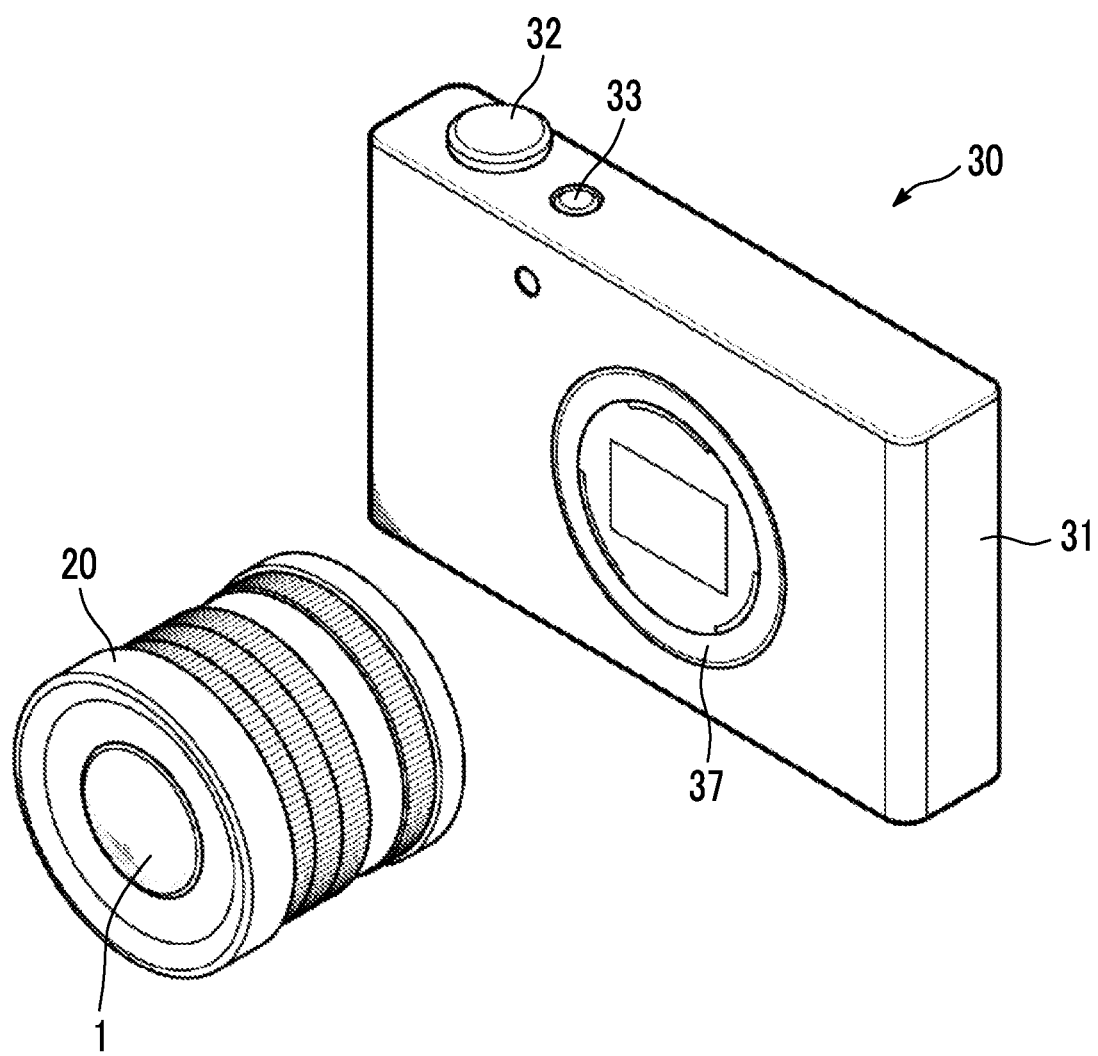
FIG. 11 is a perspective view of the front side of an imaging apparatus according to an embodiment of the present disclosure.
Figure 12:
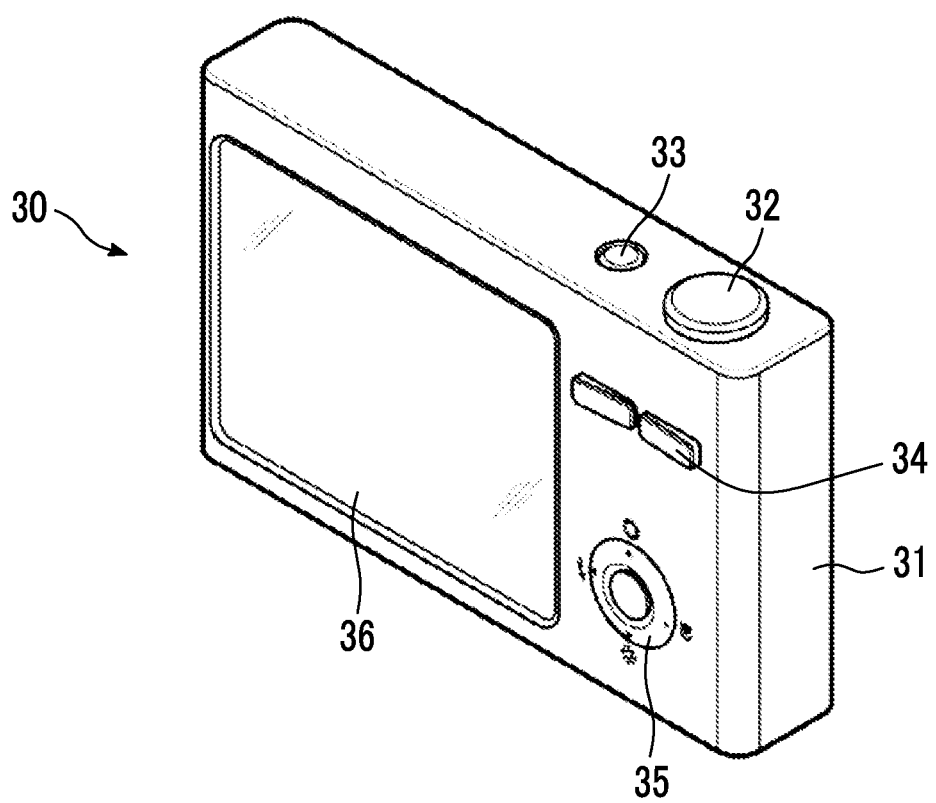
FIG. 12 is a perspective view of the rear side of an imaging apparatus according to an embodiment of the present disclosure.

Next, an imaging apparatus according to an embodiment of the present disclosure will be described. FIGS. 11 and 12 are external views of a camera 30 which is the imaging apparatus according to the embodiment of the present disclosure. FIG. 11 is a perspective view of the camera 30 viewed from the front side, and FIG. 12 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a moving image by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, as lens groups,
only three lens groups that consist of, in order from an object side to an image side, a first lens group having a positive refractive power, a second lens group having a positive refractive power, and a third lens group having a negative refractive power, wherein an aperture stop is disposed between a lens surface closest to the image side in the first lens group and a lens surface closest to the object side in the third lens group, wherein during focusing from an object at infinity to a closest object, the first lens group and the third lens group remain stationary with respect to an image plane, and the second lens group moves along an optical axis, wherein the first lens group consists of a negative lens and a positive lens in order from the object side to the image side, wherein the third lens group includes a negative lens and a positive lens in order from the object side to the image side, and wherein assuming that
a focal length of the second lens group is f2, and
a focal length of the first lens group is f1,
Conditional Expression (1) is satisfied, which is represented by $$0.25 < f2/f1 < 1 \tag{1}.$$

2. An imaging lens comprising, as lens groups,
only three lens groups that consist of, in order from an object side to an image side, a first lens group having a positive refractive power, a second lens group having a positive refractive power, and a third lens group having a negative refractive power, wherein an aperture stop is disposed between a lens surface closest to the image side in the first lens group and a lens surface closest to the object side in the third lens group, wherein during focusing from an object at infinity to a closest object, the first lens group and the third lens group remain stationary with respect to an image plane, and the second lens group moves along an optical axis, wherein the first lens group consists of a negative lens and a positive lens in order from the object side to the image side, wherein the second lens group includes at least two cemented lenses in which at least one positive lens and at least one negative lens are cemented, and wherein the third lens group includes a negative lens and a positive lens in order from the object side to the image side.

3. The imaging lens according to claim 1, wherein assuming that a focal length of the imaging lens in a state where the object at infinity is in focus is f, and
the focal length of the first lens group is f1,
Conditional Expression (2) is satisfied, which is represented by $$0.25 < f/f1 < 1 \tag{2}.$$

4. The imaging lens according to claim 1, wherein assuming that
a focal length of the imaging lens in a state where the object at infinity is in focus is f, and
the focal length of the second lens group is f2,
Conditional Expression (3) is satisfied, which is represented by $$0.8 < f/f2 < 1.6 \tag{3}.$$

5. The imaging lens according to claim 1, wherein assuming that
a focal length of the imaging lens in a state where the object at infinity is in focus is f, and
a focal length of the third lens group is f3, Conditional Expression (4) is satisfied, which is represented by $$-0.8 < f/f3 < 0 \tag{4}.$$

6. The imaging lens according to claim 1, wherein assuming that
a lateral magnification of the second lens group in the state where the object at infinity is in focus is $\beta_2$, and
a lateral magnification of the third lens group in the state where the object at infinity is in focus is $\beta_3$,
Conditional Expression (5) is satisfied, which is represented by $$1.15 < (1-\beta_2^2) \times \beta_3^2 < 2.5 \tag{5}.$$

7. The imaging lens according to claim 1, wherein the negative lens and the positive lens of the first lens group are cemented with each other.

8. The imaging lens according to claim 1, wherein the number of lenses included in the third lens group is two.

9. The imaging lens according to claim 1, wherein a negative lens closest to the object side in the third lens group is a meniscus lens which is convex toward the image side.

10. The imaging lens according to claim 1, wherein an image side surface of a positive lens closest to the image side in the third lens group is a convex surface.

11. The imaging lens according to claim 1, wherein assuming that
an Abbe number of the positive lens of the first lens group based on a d line is ν1p, and
an Abbe number of the negative lens of the first lens group based on the d line is ν1n,
Conditional Expression (6) is satisfied, which is represented by $$0 < \nu 1p - \nu 1n < 30 \tag{6}.$$

12. The imaging lens according to claim 1, wherein assuming that a refractive index of a positive lens closest to the image side in the third lens group at a d line is N3p,
Conditional Expression (7) is satisfied, which is represented by $$1.8 < N3p < 2.2 \tag{7}.$$

13. The imaging lens according to claim 8, wherein assuming that
an Abbe number of the positive lens of the third lens group based on a d line is ν3p, and
an Abbe number of the negative lens of the third lens group based on the d line is ν3n,
Conditional Expression (8) is satisfied, which is represented by $$-5 < \nu 3p - \nu 3n < 15 \tag{8}.$$

14. The imaging lens according to claim 1, wherein assuming that an average of Abbe numbers of all lenses included in the third lens group based on a d line is ν3ave,
Conditional Expression (9) is satisfied, which is represented by $$20 < \nu 3ave < 30 \tag{9}.$$

15. The imaging lens according to claim 1, wherein Conditional Expression (1-1) is satisfied, which is represented by $$0.25 < f2/f1 < 0.9 \tag{1-1}.$$

16. The imaging lens according to claim 3, wherein Conditional Expression (2-1) is satisfied, which is represented by $$0.25 < f/f1 < 0.9 \tag{2-1}.$$

17. The imaging lens according to claim 4, wherein Conditional Expression (3-1) is satisfied, which is represented by $$0.9 < f/f2 < 1.45 \qquad (3\text{-}1).$$

18. The imaging lens according to claim 5, wherein Conditional Expression (4-1) is satisfied, which is represented by $$-0.75 < f/f3 < 0 \qquad (4\text{-}1).$$

19. The imaging lens according to claim 6, wherein Conditional Expression (5-1) is satisfied, which is represented by $$1.25 < (1-\beta_2^2) \times \beta_3^2 < 2.4 \qquad (5\text{-}1).$$

20. An imaging apparatus comprising the imaging lens according to claim 1.

* * * * *